US012706566B2

(12) United States Patent
Balawi et al.

(10) Patent No.: US 12,706,566 B2
(45) Date of Patent: Aug. 11, 2026

(54) SYSTEM AND METHOD FOR DETERMINATION OF DEGRADATION LOSS ON SOLAR PANELS OF PHOTOVOLTAIC (PV) POWER PLANT

(71) Applicant: ACWA POWER Company, Riyadh (SA)

(72) Inventors: Ahmed Hesham Balawi, Thuwal (SA); Thomas Altmann, Dubai (AE)

( * ) Notice: Subject to any disclaimer, the term of this patent is extended or adjusted under 35 U.S.C. 154(b) by 182 days.

(21) Appl. No.: 18/804,666

(22) Filed: Aug. 14, 2024

(65) Prior Publication Data

US 2025/0062721 A1 Feb. 20, 2025

Related U.S. Application Data

(60) Provisional application No. 63/519,784, filed on Aug. 15, 2023.

(51) Int. Cl.
*H02S 50/10* (2014.01)
*H02S 20/32* (2014.01)
(Continued)

(52) U.S. Cl.
CPC .............. *H02S 50/10* (2014.12); *H02S 20/32* (2014.12); *H02S 40/10* (2014.12); *H02S 40/32* (2014.12); *H02S 50/15* (2014.12)

(58) Field of Classification Search
None
See application file for complete search history.

(56) References Cited

U.S. PATENT DOCUMENTS 8,744,791 B1 6/2014 Kraft et al.
9,608,563 B2 3/2017 Carretero Batista et al.
(Continued)

FOREIGN PATENT DOCUMENTS

CN 107171639 A 9/2017
CN 112737503 B 10/2021
(Continued)

OTHER PUBLICATIONS

Boero, Mauro, Authorized Officer, European Patent Office, "International Search Report" and "Written Opinion of the International Searching Authority" in connection with related International Application No. PCT/IB2024/057897, dated Jan. 14, 2025, 10 pgs.
(Continued)

*Primary Examiner* — Farhana A Hoque

(57) ABSTRACT

A system and method determines degradation loss on solar panels of a photovoltaic (PV) power plant by obtaining a first set of information that includes location of a set of the solar panels, real-time weather associated with the set of solar panels, and configuration of the solar panels of that set. The system and method also obtains a second set of information that includes real-time-operating parameters associated with the PV power plant based upon the first set of information. The first and second set of information are fed to a machine-learning (ML) model to determine a degradation loss associated with each solar panel of the set based upon an output of the ML model and, when appropriate, the system and method issues an alert based upon the determined degradation loss.

20 Claims, 8 Drawing Sheets

(51) Int. Cl.

| | |
|---|---|
| ***H02S 40/10*** | (2014.01) |
| ***H02S 40/32*** | (2014.01) |
| ***H02S 50/15*** | (2014.01) |

(56) References Cited

U.S. PATENT DOCUMENTS

| | | | |
|---|---|---|---|
| 9,830,301 B1 | 11/2017 | Batten et al. | |
| 10,396,710 B2 | 8/2019 | Chen et al. | |
| 10,495,786 B2 | 12/2019 | Herzig et al. | |
| 10,734,946 B2 | 8/2020 | Fernandez et al. | |
| 10,998,853 B2 | 5/2021 | Azad et al. | |
| 11,068,563 B2 | 7/2021 | Hoff | |
| 11,500,397 B2 | 11/2022 | Sharp et al. | |
| 11,621,668 B2 | 4/2023 | Rao et al. | |
| 2011/0066401 A1 | 3/2011 | Yang et al. | |
| 2011/0282600 A1 | 11/2011 | Roesner et al. | |
| 2017/0104451 A1 | 4/2017 | Gostein | |
| 2017/0271912 A1 | 9/2017 | Bhowmik et al. | |
| 2018/0188301 A1 | 7/2018 | McBrearty et al. | |
| 2021/0281213 A1 | 9/2021 | Jones et al. | |
| 2021/0305936 A1 | 9/2021 | Bamberger et al. | |
| 2022/0300363 A1* | 9/2022 | Barat | G06F 11/079 |

FOREIGN PATENT DOCUMENTS

| | | |
|---|---|---|
| CN | 113839618 A | 12/2021 |
| CN | 114648251 A | 6/2022 |
| CN | 115392677 A | 11/2022 |
| EP | 3506448 A1 | 7/2019 |
| EP | 3818626 A4 | 3/2022 |
| KR | 20170074832 A | 6/2017 |
| WO | 2020010290 A1 | 1/2020 |
| WO | 2021255269 A1 | 12/2021 |
| WO | 2022043872 A1 | 3/2022 |
| WO | 2023031843 A1 | 3/2023 |

OTHER PUBLICATIONS

Boero, Mauro, Authorized Officer, European Patent Office, "International Search Report" and "Written Opinion of the International Searching Authority" in connection with related International Application No. PCT/IB2024/057898, dated Feb. 4, 2025, 9 pgs.

Ducange, Pietro et al., "An Intelligent System for Detecting Faults in Photovoltaic Fields", IEEE Xplore, 2011, pp. 1341-1346.

Lee, Beomseok et al., "Degradation Diagnosis System of Photovoltaic Panels with Mobile Application", IEEE Transactions on Consumer Electronics, vol. 60, No. 3, Aug. 2014, pp. 338-346.

Martin-Martinez, S. et al., "Performance evaluation of large solar photovoltaic power plants in Spain", Energy Conversion and Management, vol. 183, Mar. 1, 2019, pp. 515-528.

Bastidas-Rodriguez, Juan David et al., "Model Based Degradation Analysis of Photovoltaic Modules Through Series Resistance Estimation", IEEE Transactions on Industrial Electronics, vol. 62, Issue 11, Jul. 21, 2015, pp. 7256-7265.

* cited by examiner

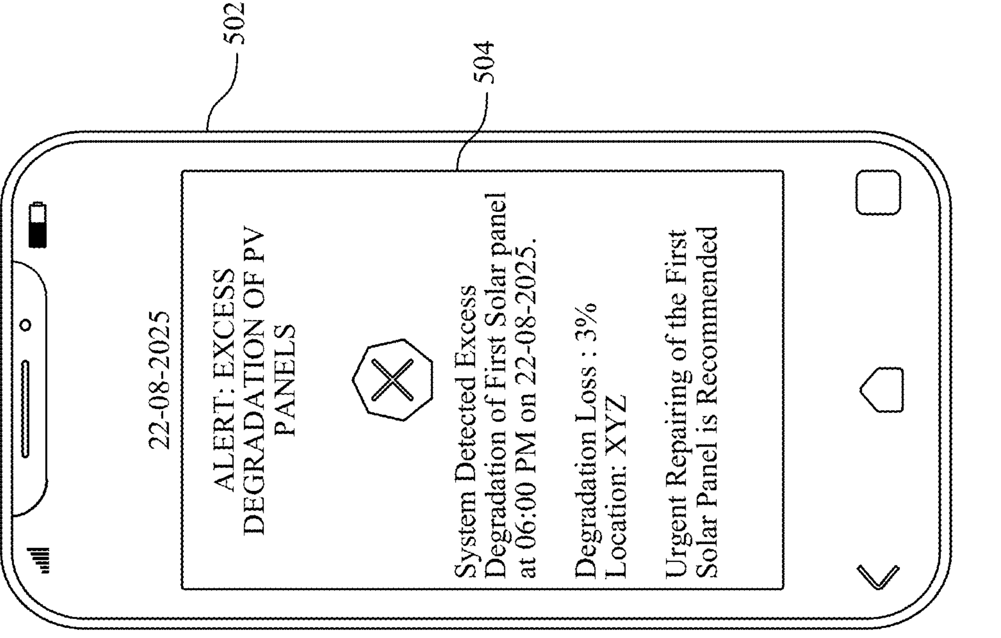
FIG. 5

SYSTEM AND METHOD FOR DETERMINATION OF DEGRADATION LOSS ON SOLAR PANELS OF PHOTOVOLTAIC (PV) POWER PLANT

CROSS-REFERENCE TO RELATED APPLICATION

This application claims priority to U.S. Provisional Patent Application Ser. No. 63/519,784, filed Aug. 15, 2023 and entitled SYSTEM AND METHOD FOR PHOTOVOLTAIC (PV) PLANT MONITORING AND DIAGNOSTICS, the disclosure of which is incorporated herein by reference.

TECHNOLOGICAL FIELD

The present disclosure generally relates to a photovoltaic (PV) plant, and more particularly relates to a system and a method for determination of degradation loss on solar panels of photovoltaic (PV) power plant.

BACKGROUND

With the advantages in the field of electrical engineering, photovoltaic (PV) industry has been rapidly growing as solar energy becomes a trending source of renewable energy. The PV industry utilizes PV power plants as power generation facilities to generate electric power by utilizing solar energy. The solar energy is a clean, renewable source that utilizes solar radiation to produce electric power. The generation of electric power in PV plants is based on photoelectric effect, by which certain materials can absorb photons (such as light particles) and release electrons, generating an electric current. This photoelectric effect is utilized by semiconductor devices like PV cells to generate electricity. For example, PV cells can be made of monocrystalline, polycrystalline or amorphous silicon, or other thin-film semiconductor materials. PV power plants further include various components such as PV panels, solar trackers, inverters, transformers, and so forth. Each PV panel corresponds to a group of PV cells configured to capture solar radiation and transform light into electrical energy.

However, degradation of PV panels of these PV power plants is one of the major challenges faced by the PV industry. The PV panels of the PV power plants may degrade with the passage of time due to various factors like humidity, temperature and ultraviolet (UV) radiation. In addition, various other components of the PV power plants associated with the PV panels such as the inverters or the transformers may malfunction or may operate at decreased efficiencies. Furthermore, the solar trackers associated with the PV panels may underperform due to issues, such as halting of the solar trackers or tilting of the solar trackers at undesired angles. The degradation of PV panels may cause losses to the overall energy generated by the PV power plant which may further cause financial losses to the PV power plants. Since the PV panels may be expected to be operational for at least 25-30 years, determination of degradation loss associated with the PV panels may be crucial for early detection of degradation of these solar panels, ensuring the longevity of each PV panel and optimizing the individual energy output of each PV panel, thereby optimizing the overall energy output of the PV power plants.

Several methods have been used for determination of degradation loss associated with the PV panels. A commonly used approach involves the use of visual inspections. These visual inspections may be a low-cost method for determination of degradation loss. However, these visual inspections may be subjected to human error and may be labor-intensive. Another method for determination of degradation loss involves the usage of electrical performance tests. The electrical performance tests, such as current-voltage (IV) curve tracing and module-level monitoring may detect performance change of the PV power plants due to degradation of PV panels. However, these electrical performance tests may require specialized equipment and may only detect degradation in the PV panels that are being tested and not the entire PV power plant at once. Yet another method for determination of degradation loss involves the usage of infrared thermography. The infrared thermography may detect thermal anomalies caused by the degradation of the PV panels. However, this infrared thermography may require specific weather conditions and interpretation of its output may be complex. A drawback with such methods may be that none of the existing methods may be capable of determining degradation loss for detecting the early stages of degradation of these PV panels. Another drawback of existing solutions is that they may not be suitable for large-scale PV plants. Additionally, some of these solutions may be expensive and may require specialized equipment, that may not be feasible for small-scale or medium-scale PV plants.

Therefore, there is a need for an improved method for determination of degradation loss to solve the problems associated with the traditional methods.

BRIEF SUMMARY

A system, a method, and a computer programmable product are provided for implementing the process of determination of degradation loss on solar panels of photovoltaic (PV) power plant.

In one aspect, a system for determination of degradation loss on solar panels of photovoltaic (PV) power plant is disclosed. The system includes a memory configured to store a computer-executable instruction, and one or more processors are operatively coupled to the memory. The one or more processors may be configured to obtain first information including location information associated with a set of solar panels of a photovoltaic (PV) power plant, real time weather information associated with the set of solar panels of the PV power plant, and configuration information associated with the set of solar panels of the PV power plant. The one or more processors may further be configured to obtain second information including real-time operating parameters associated with the PV power plant from a set of sensors based on the obtained first information. The set of sensors may be associated with the set of solar panels. The one or more processors may further be configured to provide the obtained first information and the obtained second information as an input to a machine learning (ML) model. The ML model may be a pre-trained model. The one or more processors may further be configured to determine a degradation loss associated with each solar panel of the set of solar panels based on an output of the ML model. The one or more processors may further be configured to render an alert based on the determined degradation loss.

In additional system embodiments, the one or more processors may further be configured to compare the determined degradation loss associated with each solar panel of the set of solar panels with a pre-determined threshold loss. The one or more processors may further be configured to render the alert including an identifier associated with a first solar panel of the set of solar panels based on the comparison. The degradation loss associated with the first solar panel may be greater than the pre-determined threshold loss.

In additional system embodiments, the real-time operating parameters may include at least one of an operational current parameter associated with the set of solar panels, an operational voltage parameter associated with the set of solar panels, a tilt angle of one or more trackers associated with the set of solar panels, or an internal temperature of an inverter associated with the PV power plant.

In additional system embodiments, the real-time weather information associated with the set of solar panels may include at least one of an ultraviolet (UV) index at a location of the set of solar panels, solar irradiance at the location of the set of solar panels, a wind speed at the location of the set of solar panels, a wind direction at the location of the set of solar panels, an ambient temperature at the location of the set of solar panels, solar irradiance at a front plane of the set of solar panels, solar irradiance at a rear plane of the set of solar panels, a temperature of the set of solar panels, or a humidity at the location of the set of solar panels.

In additional system embodiments, the one or more processors may further be configured to validate the obtained second information associated with the set of solar panels based on application of one or more data validation techniques on the obtained second information. The one or more processors may further be configured to provide the validated second information as the input to the ML model.

In additional system embodiments, the one or more processors may further be configured to obtain reference information associated with the set of solar panels from one or more sources based on the obtained second information. The reference information may include at least one of a commissioning date associated with the set of solar panels or a pre-determined threshold loss. The one or more processors may further be configured to provide the obtained reference information as the input to the ML model and determine the degradation loss associated with each solar panel of the set of solar panels based on the output of the ML model.

In additional system embodiments, the output of the ML model may be a diagnostic chart indicative of one of an increase in the degradation loss over a first time period, or a decrease in the degradation loss over the first time period.

In additional system embodiments, the diagnostic chart may correspond to a heatmap associated with the PV power plant. The heatmap may indicate a distribution of the degradation loss over the PV power plant.

In additional system embodiments, the first information and second information may be obtained for a first time period. The first time period may be greater than a predefined threshold time period.

In additional system embodiments, the rendered alert may further include the degradation loss associated with each solar panel of the set of solar panels and one or more recommendations associated with one of a repair of the set of solar panels or a replacement of the set of solar panels.

In additional system embodiments, the one or more processors may further be configured to generate one or more charts indicative of the degradation loss based on the obtained first information, obtained second information, the determined degradation loss, and a training dataset associated with historical degradation loss events. The ML model may be pre-trained on the training dataset. The one or more processors may further be configured to render the generated one or more charts.

In another aspect, a method for determination of degradation loss on solar panels of photovoltaic (PV) power plant is disclosed. The method may include obtaining first information including location information associated with a set of solar panels of a photovoltaic (PV) power plant, real time weather information associated with the set of solar panels of the PV power plant, and configuration information associated with the set of solar panels of the PV power plant. The method may further include obtaining second information including real-time operating parameters associated with the PV power plant from a set of sensors based on the obtained first information. The set of sensors may be associated with the set of solar panels. The method may further include providing the obtained first information and the obtained second information as an input to a machine learning (ML) model. The ML model may be a pre-trained model. The method may further include determining a degradation loss associated with each solar panel of the set of solar panels based on an output of the ML model. The method may further include rendering an alert based on the determined degradation loss.

In additional method embodiments, the method may further include comparing the determined degradation loss associated with each solar panel of the set of solar panels with a pre-determined threshold loss. The method may further include rendering the alert including an identifier associated with a first solar panel of the set of solar panels based on the comparison. The degradation loss associated with the first solar panel may be greater than the pre-determined threshold loss.

In additional method embodiments, the real-time operating parameters may include at least one of an operational current parameter associated with the set of solar panels, an operational voltage parameter associated with the set of solar panels, a tilt angle of one or more trackers associated with the set of solar panels, or an internal temperature of an inverter associated with the PV power plant.

In additional method embodiments, the real-time weather information associated with the set of solar panels may include at least one of an ultraviolet (UV) index at a location of the set of solar panels, solar irradiance at the location of the set of solar panels, a wind speed at the location of the set of solar panels, a wind direction at the location of the set of solar panels, an ambient temperature at the location of the set of solar panels, solar irradiance at a front plane of the set of solar panels, solar irradiance at a rear plane of the set of solar panels, a temperature of the set of solar panels, or a humidity at the location of the set of solar panels.

In additional method embodiments, the method may further include validating the obtained second information associated with the set of solar panels based on application of one or more data validation techniques on the obtained second information. The method may further include providing the validated second information as the input to the ML model.

In additional method embodiments, the method may further include obtaining reference information associated with the set of solar panels from one or more sources based on the obtained second information. The reference information may include at least one of a commissioning date associated with the set of solar panels and a pre-determined threshold loss. The method may further include providing the obtained reference information as the input to the ML model. The method may further include determining the degradation loss associated with each solar panel of the set of solar panels based on the output of the ML model.

In additional method embodiments, the output of the ML model may be a diagnostic chart indicative of one of an increase in the degradation loss over a first time period, a decrease in the degradation loss over the first time period.

In additional method embodiments, the first information and second information may be obtained for a first time period. The first time period may be greater than a predefined threshold time period.

In yet another aspect, a computer program product including a non-transitory computer readable medium having stored thereon computer executable instruction which when executed by at least one processor, cause the processor to conduct operations for determination of degradation loss on solar panels of photovoltaic (PV) power plant is disclosed. The operations may include obtaining first information including location information associated with a set of solar panels of a photovoltaic (PV) power plant, real time weather information associated with the set of solar panels of the PV power plant, and configuration information associated with the set of solar panels of the PV power plant. The operations may further include obtaining second information including real-time operating parameters associated with the PV power plant from a set of sensors based on the obtained first information. The set of sensors may be associated with the set of solar panels. The operations may further include providing the obtained first information and the obtained second information as an input to a machine learning (ML) model. The ML model may be a pre-trained model. The operations may further include determining a degradation loss associated with each solar panel of the set of solar panels based on an output of the ML model. The operations may further include transmitting one or more instructions associated with at least one of repairing of at least one solar panel of the set of solar panels or replacement of at least one solar panel of the set of solar panels to at least one of a set of robots or a set of user devices based on the determined degradation loss. The set of user devices may be associated with a set of operators associated with the PV power plant.

The determination of degradation loss associated with each solar panel of the set of solar panels may help in identifying a root cause for overall degradation loss associated with the PV power plant. Identification and timely addressal of the root cause of the overall degradation loss may prevent further damage to the PV power plant and may protect the PV power plant from future degradation losses. Therefore, the disclosed system may be essential for efficient operations and maintenance of the PV power plant.

The disclosed system may ensure long term performance and reliability of the PV power plant. The determination of the degradation loss associated with each solar panel of the set of solar panels of the PV power plant may allow timely identification of underperforming solar panels and failing solar panels, so that the underperforming solar panels may be repaired, and the failing solar panels may be replaced before they may cause significant performance damage and financial damages to the PV power plant.

The disclosed system may monitor the real-time performance of the PV power plant and may enable mapping of distribution of the degradation loss associated with each solar panel of the set of solar panels associated with the PV power plant. The disclosed system may be applied to large scale PV power plants, where determination of the degradation loss for each solar panel may be a difficult and a time-consuming task. By determining the degradation loss for each solar panel associated the PV power plant, the disclosure may allow timely identification of the specific solar panels, which may be underperforming, making it easier to target the specific solar panels and improve the overall performance of the PV power plant.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
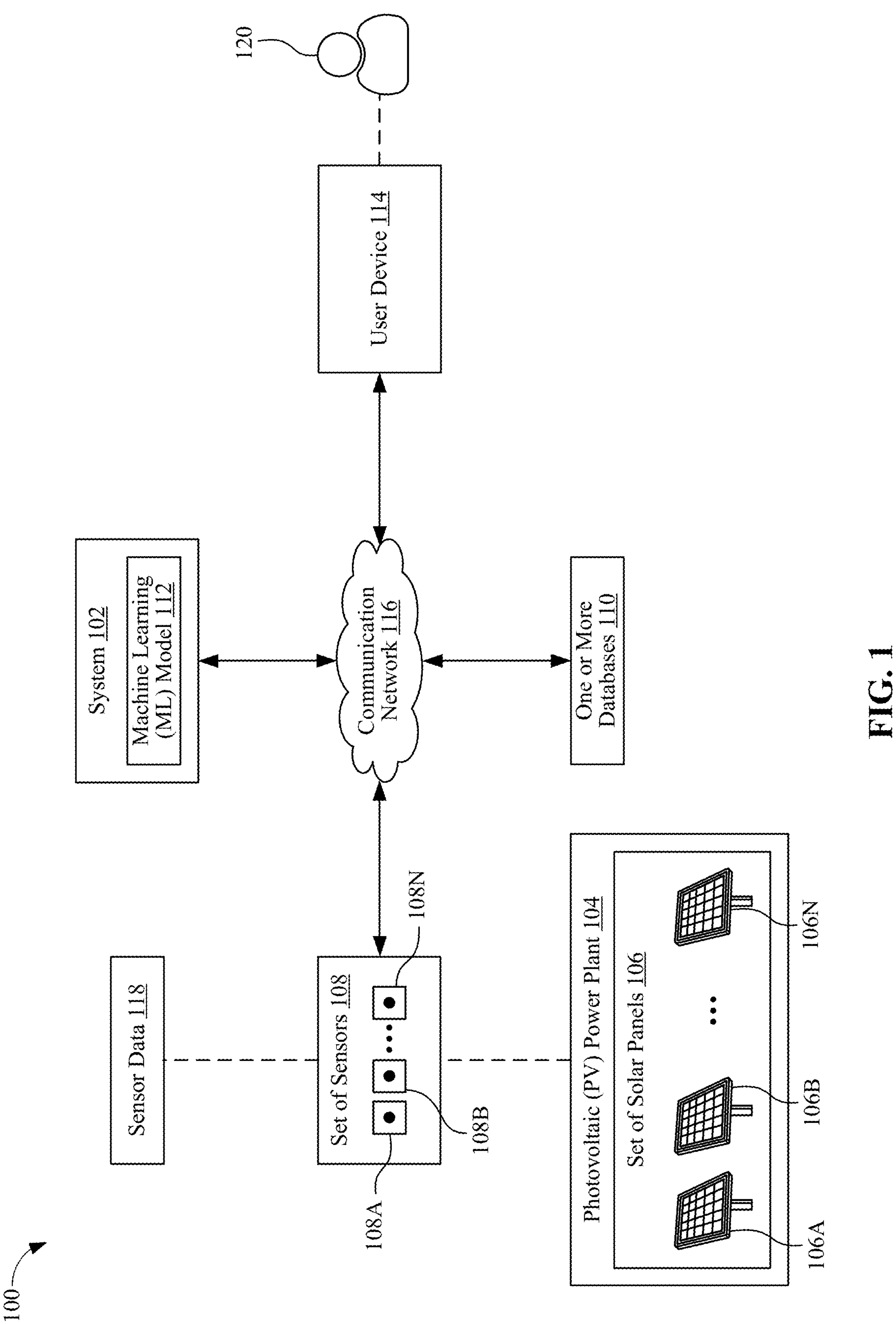
Figure 2:
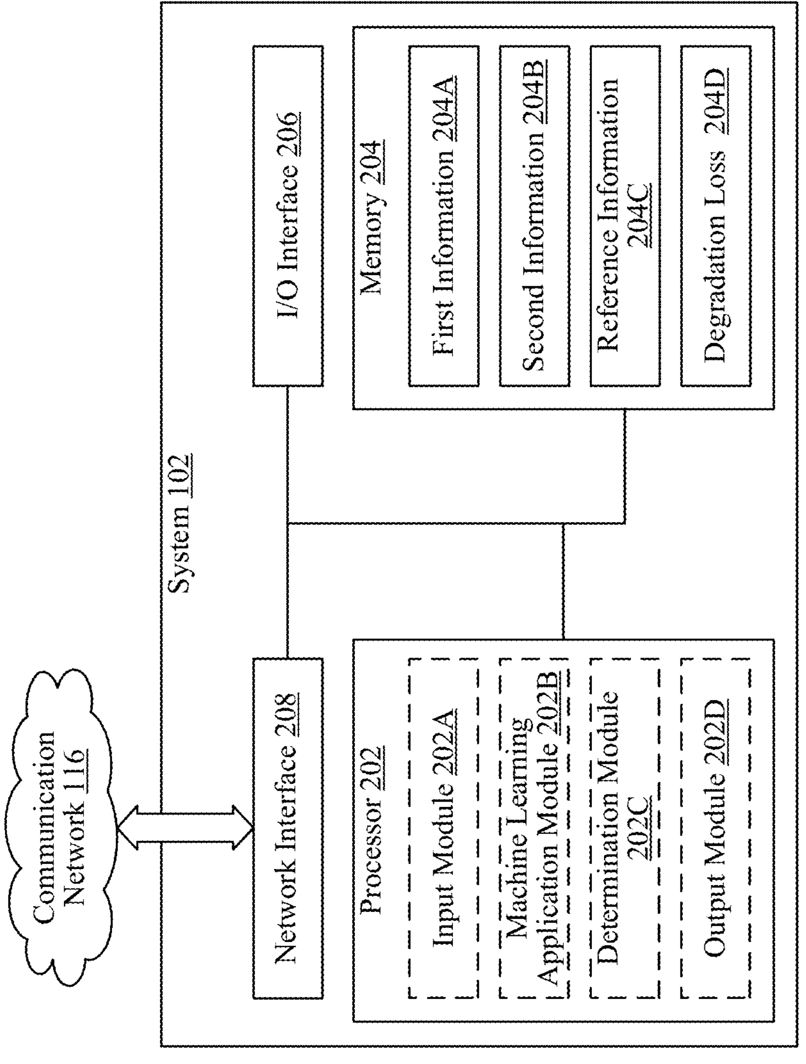
Figure 3:
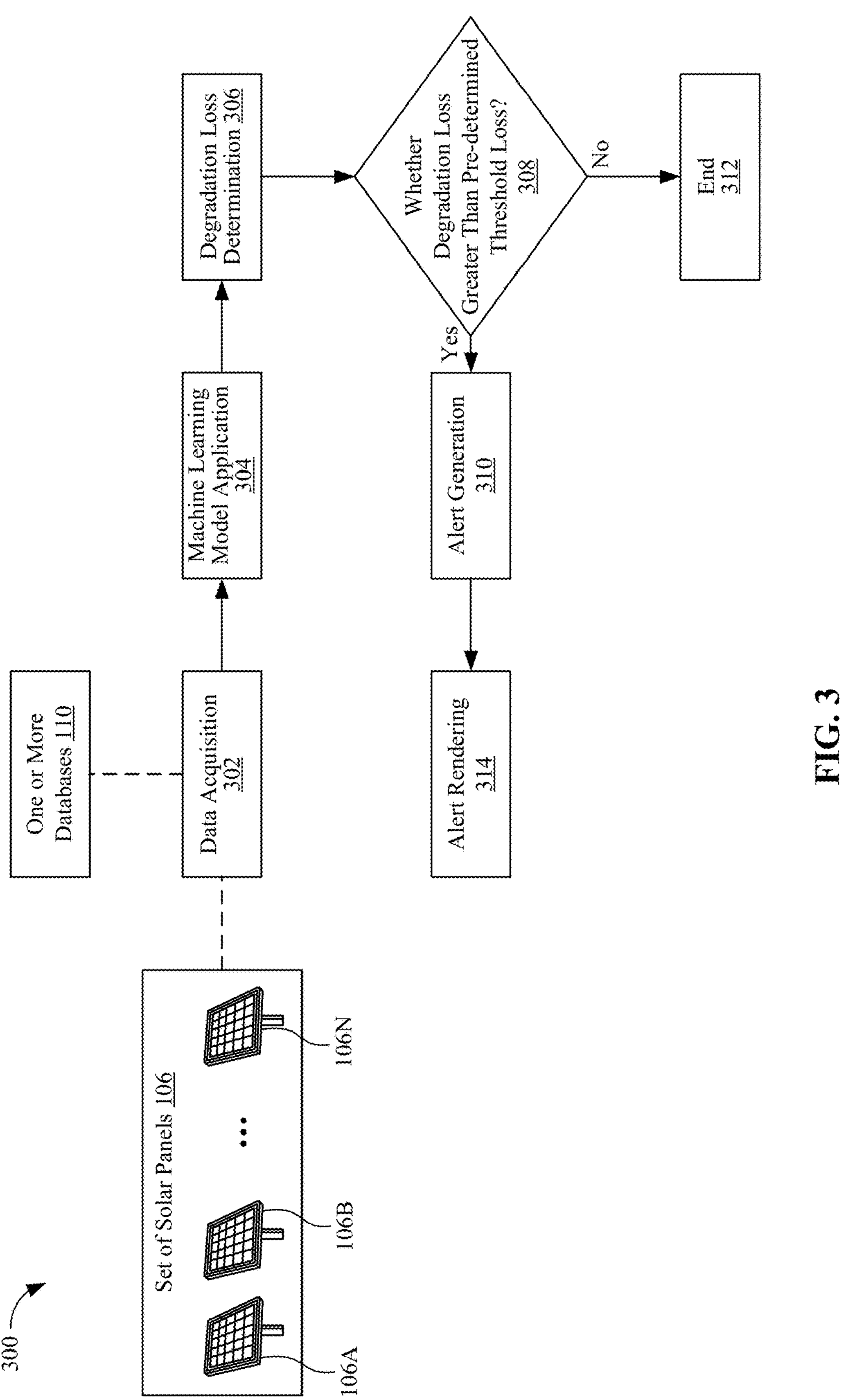
Figure 4:
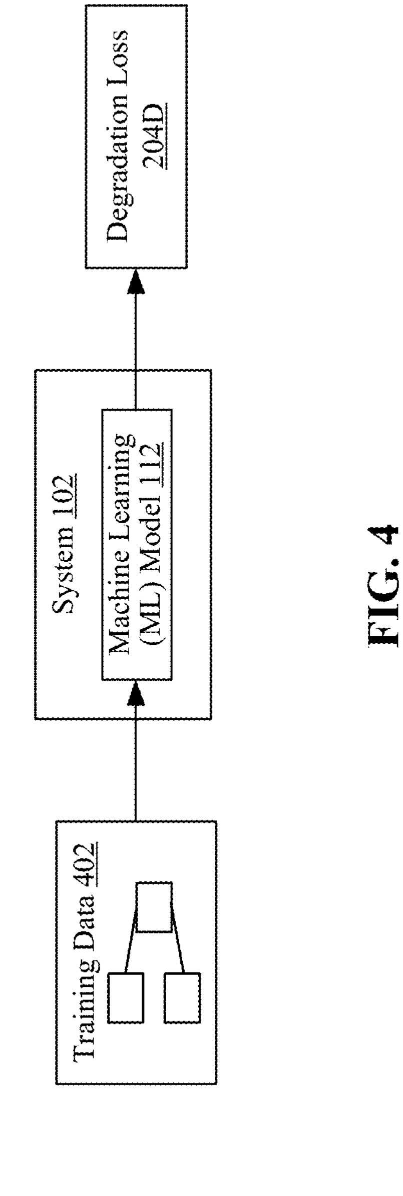
Figure 6:
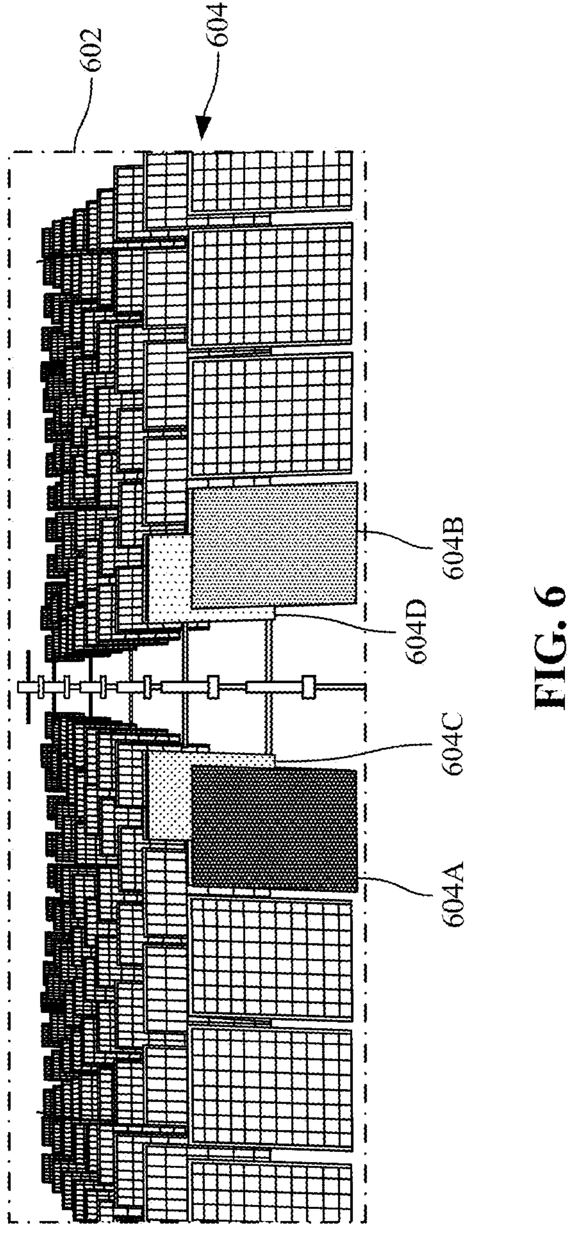
Figure 7:
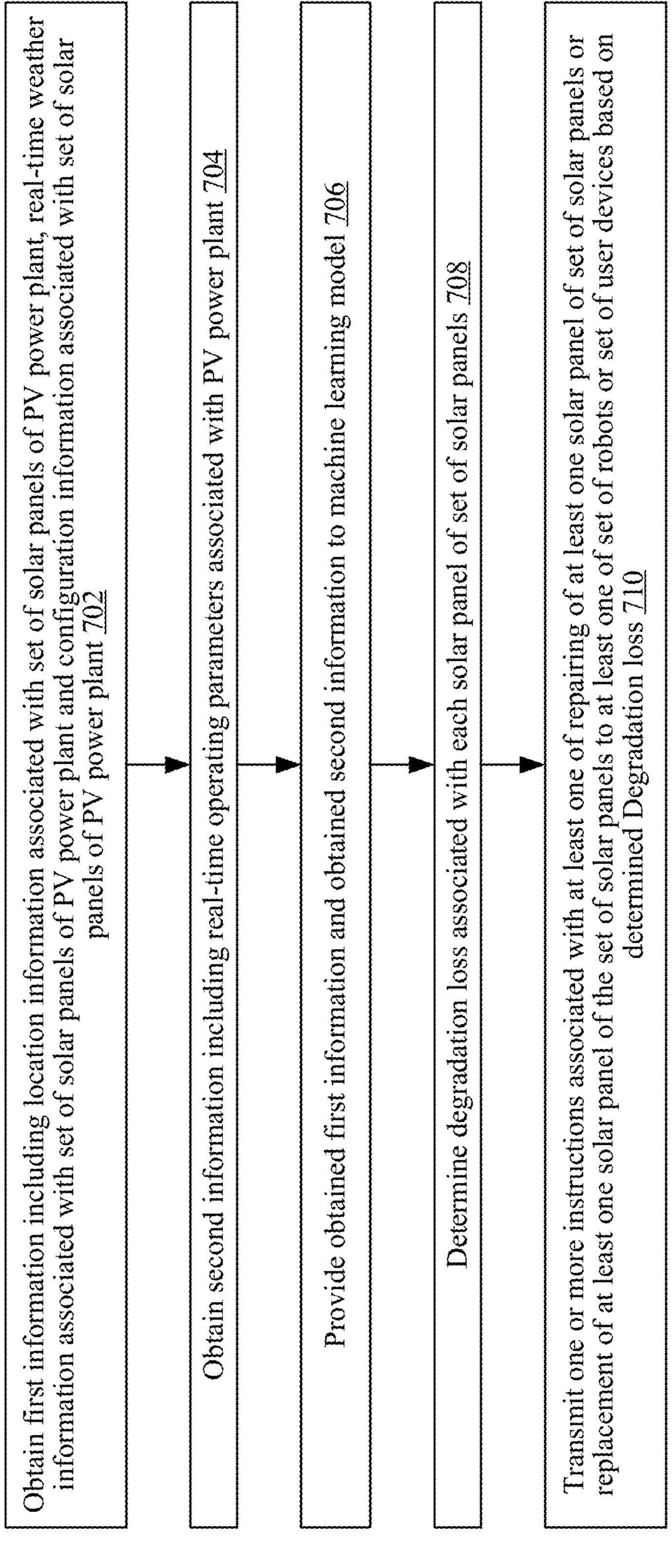
Figure 8:
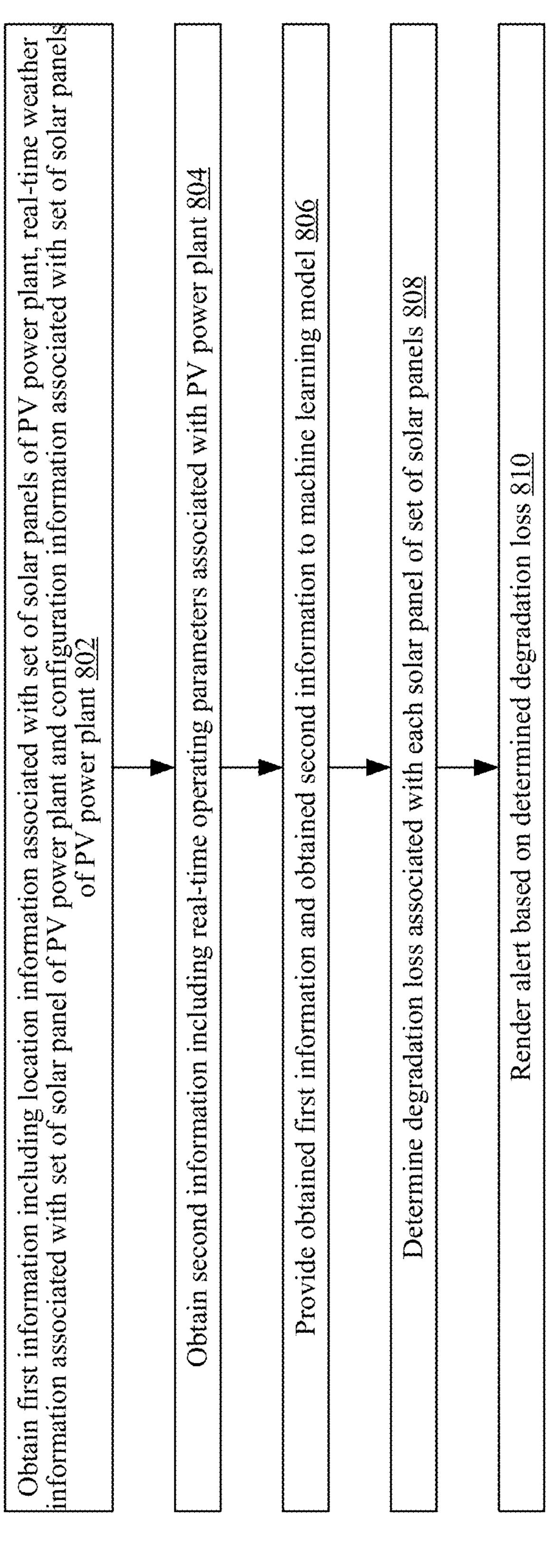

Having thus described example embodiments of the disclosure in general terms, reference will now be made to the accompanying drawings, which are not necessarily drawn to scale, and wherein:

FIG. 1 illustrates a network environment for determination of degradation loss on solar panels of a photovoltaic (PV) power plant, in accordance with an embodiment of the present disclosure;

FIG. 2 illustrates a block diagram of the system of FIG. 1, in accordance with an embodiment of the present disclosure;

FIG. 3 is a diagram that illustrates exemplary operations for determination of degradation loss on solar panels of a photovoltaic (PV) power plant, in accordance with an embodiment of the disclosure;

FIG. 4 illustrates a block diagram depicting training of an exemplary machine learning model for determination of degradation loss on solar panels, in accordance with an exemplary embodiment of the disclosure;

FIG. 5 is a diagram that illustrates an exemplary alert associated with the degradation loss, in accordance with an embodiment of the disclosure;

FIG. 6 is a diagram that illustrates an exemplary heatmap depicting degradation loss on solar panels of a photovoltaic (PV) power plant, in accordance with an embodiment of the disclosure;

FIG. 7 is a flowchart that illustrates a first exemplary method for determination of degradation loss on solar panels of a photovoltaic (PV) power plant, in accordance with an embodiment of the disclosure;

FIG. 8 is a flowchart that illustrates a second exemplary method for determination of degradation loss on solar panels of a photovoltaic (PV) power plant, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data", "content," "information", and similar terms may be used interchangeably to refer to data capable of being displayed, transmitted, received, and/or stored in accordance with embodiments of the present disclosure. Thus, the use of any such terms should not be taken to limit the spirit and scope of embodiments of the present disclosure.

As defined herein, a "computer-readable storage medium," which refers to a non-transitory physical storage medium (for example, a volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

The present disclosure may provide a system, a method, and a computer programmable product for determination of degradation loss on solar panels of a photovoltaic (PV) power plant. The present disclosure presents an efficient, cost-effective, and accurate approach for determination of degradation loss associated with each solar panel of a set of solar panels of the PV power plant, which significantly contributes to optimizing performance and maintenance of the PV power plants.

The flexibility in application of the disclosed system may include the small-scale PV power plants like residential solar power systems, to the medium-scale PV power plants like commercial solar power systems and up to the large-scale PV power plants like utility-scale solar power systems. The determination of the degradation loss associated with each solar panel of the set of solar panels of the PV power plant may allow the present disclosure to be applicable to even the large-scale PV power plants where determination of degradation of each solar panel may be considerably difficult.

Furthermore, the disclosed system may provide real-time feedback on the performance of the PV power plant, allowing early detection of the degradation loss before the degradation loss may arise as a major issue for causing further damage to the PV power plant. The determination of the degradation loss may be used by operators of PV power plants to monitor and optimize the performance of their PV power plants and to detect and mitigate the effects of degradation of solar panels which may help to extend the lifetime of the set of solar panels and reduce the maintenance costs of the PV power plant.

Additionally, the disclosed system may further be utilized by the manufacturers of PV solar panels to test the quality of the PV solar panels and the performance of the PV solar panels. The test of the quality and performance of the PV solar panels may help in providing feedback for improving the designs of the PV solar panels. Also, the disclosed system may be utilized by scientists and researchers to study the performance of the PV solar panels in different environmental conditions, and to develop new materials and designs that may be more resistant to the degradation.

Furthermore, the disclosed system may be adapted for use with different data acquisition systems and data analysis platforms. The disclosed system may be combined with other technologies such as module-level power electronics and advanced monitoring systems, for providing a comprehensive solution for optimizing the performance of the PV power plant and minimizing maintenance costs of the PV power plant.

FIG. 1 is a diagram that illustrates a network environment 100 of a system 102 for determination of degradation loss on solar panels of a photovoltaic (PV) power plant, in accordance with an embodiment of the present disclosure. With reference to FIG. 1, there is shown a diagram of the network environment 100. The network environment 100 includes a system 102, a photovoltaic (PV) power plant 104, a set of solar panels 106, a set of sensors 108, and one or more databases 110. The network environment 100 further includes a machine learning (ML) model 112, a user device 114, a communication network 116, sensor data 118 and a user 120. The set of solar panels 106 may include a first solar panel 106A, a second solar panel 106B, up to an Nth solar panel 106N. The set of sensors 108 may include one or more sensors, for example, a first sensor 108A, a second sensor 108B, up to an Nth sensor 108N.

The system 102 may include suitable logic, circuitry, interfaces, and/or code that may be configured to determine a degradation loss associated with each solar panel of the set of solar panels 106 of the PV power plant 104. In this context, the system 102 may be configured to obtain first information including location information associated with the set of solar panels 106 of the PV power plant 104, real-time weather information associated with the set of solar panels 106 of the PV power plant 104 and configuration information associated with the set of solar panels 106 of the PV power plant 104. The system 102 may then be configured to obtain second information including real-time operating parameters associated with the PV power plant 104 from the set of sensors 108 based on the obtained first information. The set of sensors 108 may be associated with the set of solar panels 106. The system 102 may further be configured to provide the obtained first information and the obtained second information as an input to the ML model 112. The ML model 112 may be a pre-trained model. The system 102 may further be configured to determine the degradation loss associated with each solar panel of the set of solar panels 106 based on an output of the ML model 112. Further, the system 102 may be configured to render an alert based on the determined degradation loss. Examples of the system 102 may include, but are not limited to, a computing device, a mainframe machine, a server, a computer workstation, a smartphone, a cellular phone, a mobile phone, a gaming device, and/or a consumer electronic (CE) device.

The PV power plant 104 may correspond to a large-scale grid-connected photovoltaic power system designed to supply power to the electrical grid. The PV power plant 104 may be configured to generate electricity from sunlight using photoelectric effect phenomenon. The photoelectric effect phenomenon may refer to a scientific phenomenon in which specific materials absorb sunlight photons to displace electrons and generate a direct current (DC). An inverter associated with the PV power plant 104 may then convert the DC current into alternating current (AC). The PV power plant 104 may be crucial for the clean energy transition, as the process utilizes sunlight as a source to generate energy, thereby not generate polluting gases and is a cost-effective option for new electricity generation. Examples of the PV power plant 104 may include at least one of, but not limited to, a solar park, a solar farm, and a solar power plant.

The PV power plant 104 may further include the set of solar panels 106. The set of solar panels 106 may further include the first solar panel 106A, the second solar panel 106B, up to the Nth solar panel 106N. Each solar panel of the set of solar panels 106 may be composed of photovoltaic cells capable of efficiently capturing sunlight and converting it into electricity. The set of solar panels 106 may be arranged in large arrays across vast areas and may be directly connected to inverters that convert the DC electricity into alternating current (AC), which may be suitable for distribution through power lines. The generated electricity may then be fed into the grid associated with the PV power plant 104, contributing to the overall energy supply. Examples of each solar panel of the set of solar panels 106 may include one of, but not limited to, a monocrystalline solar panel, a polycrystalline solar panel, a thin film solar panel, and a Passivated Emitter and Rear Cell (PERC) solar panel.

Each sensor of the set of sensors 108 may include suitable logic, circuitry, interfaces, and/or code that may be configured to detect and measure physical phenomena, converting them into digital or analog signals that can be processed by the system 102. The set of sensors may include the first sensor 108A, the second sensor 108B, up to the Nth sensor 108N. Each sensor of the set of sensors 108 may be configured to generate the sensor data 118 associated with the set of solar panels 106. In an embodiment, the set of sensors 108 may be configured to continuously measure the real-time operating parameters associated with the PV power plant 104 and generate the sensor data 118. In an exemplary embodiment, the set of sensors 108 may include, for example, but not limited to a set of current measuring sensors and a set of voltage measuring sensors. The set of current measuring sensors may be configured to generate an operational current parameter associated with the set of solar panels 106 and the set of voltage measuring sensors may be configured to generate an operational voltage parameter associated with the set of solar panels 106.

In another exemplary embodiment, the set of sensors 108 may include, for example, but not limited to, a set of temperature measuring sensors. The set of temperature measuring sensors may be configured to measure an internal temperature of the inverter associated with the set of solar panels 106 of the PV power plant 104. In yet another exemplary embodiment, the set of sensors 108 may include, for example, a set of motion sensors. The set of motion sensors may be configured to generate a tilt angle of one or more trackers associated with the set of solar panels 106 of the PV power plant 104. The one or more trackers may refer to one or more devices associated with the set of solar panels 106 that allow each solar panel of the set of solar panels 106 to follow the sun's path in the sky for maximizing energy production of the PV power plant. Examples of the set of sensors 108 may further include, but not limited to, a set of inertia sensors, a set of image capture sensors, a set of proximity sensors, a set of Light Detection and Ranging (LiDAR) sensors, and a set of ultrasonic sensors.

Each of the one or more databases 110 may include suitable logic, circuitry, interfaces, and/or code that may be configured to organize the collection of data stored in a computer (say the system 102), typically in the form of tables with rows and columns. The one or more databases 110 may include various databases such as, but not limited to, a first database, and a second database. Further, the one or more databases 110 may include a first table, and a second table. The one or more databases 110 may be managed by a database management system (DBMS) that may facilitate data entry, storage, retrieval, and organization The one or more databases 110 may allow easy access, management, modification, and organization of data. In an embodiment, each of the one or more databases 110 may correspond to one of a relational (SQL) database or a non-relational (NoSQL) database, offering different query languages and data organization methods. The one or more databases 110 may support transactional and analytical data processing, enabling real-time recording of activities and informed decision-making through data analysis.

The one or more databases 110 may be connected to the system 102 and the PV power plant 104 via the communication network 116. In this context, the one or more databases 110 may be configured to store data and information generated by the system 102 and/or the set of sensors 108. In an embodiment, the one or more databases 110 may store the sensor data 118 generated by the set of sensors 108. In an embodiment, the system 102 may be configured to retrieve the sensor data 118 associated with the set of solar panels 106 from the one or more databases 110.

The ML model 112 may correspond to a neural network-based classifier. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons). Outputs of all nodes in the input layer may be coupled to at least one node of the hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result.

The number of layers and the number of nodes in each layer may be determined from hyper-parameters of the neural network. Such hyper-parameters may be set before or while training the neural network on a training dataset. Each node of the neural network may correspond to a mathematical function (e.g., a sigmoid function or a rectified linear unit) with a set of parameters, tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

The neural network may include electronic data, such as, for example, a software program, code of the software program, libraries, applications, scripts, or other logic or instructions for execution by a processing device, such as circuitry. The neural network may be implemented using hardware including a processor, a microprocessor (e.g., to perform or control the performance of one or more operations), a field-programmable gate array (FPGA), or an application-specific integrated circuit (ASIC). Alternatively, in some embodiments, the neural network may be implemented using a combination of hardware and software. Accordingly, in some embodiments, the ML model 112 may be a separate entity in the system 102, without deviation from the scope of the disclosure. The ML model 112 may be configured to receive the obtained first information and the obtained second information as an input from the system 102.

The ML model 112 may further generate the output indicative of the degradation loss associated with each solar panel of the set of solar panels 106 of the PV power plant 104. The output may then be utilized by the system 102 to determine the degradation loss associated with each solar panel of the set of solar panels 106 of the PV power plant 104. Examples of the ML model 112 may include, but are not limited to, an artificial neural network (ANN), a deep neural network (DNN), a convolutional neural network (CNN), a fully connected neural network, and/or a combination of such networks.

The user device 114 may include suitable logic, circuitry, interfaces, and/or code that may be configured to output the rendered alert. The user device 114 may be configured to output the alert rendered by the system 102 based on the determined degradation loss. The alert may be displayed to the user 120 for one of a repair of the set of solar panels 106 or a replacement of the set of solar panels 106. In this context, the user device 114 may include suitable components, for example, at least, but not limited to, a user interface, to display the rendered alert as a notification based on the determined degradation loss associated with each solar panel of the set of solar panels 106 of the PV power plant 104. The user device 114 may further be utilized by the system 102 to display the output of the ML model 112. Examples of the user device 114 may include, but are not limited to, a computing device, a smartphone, a cellular phone, a mobile phone, a mainframe machine, a server, a computer workstation, and/or a consumer electronic (CE) device.

The communication network 116 may be wired, wireless, or any combination of wired and wireless communication networks, such as cellular, Wi-Fi, internet, local area networks, or the like. In some embodiments, the communication network 116 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The sensor data 118 may include the data generated by the set of sensors 108 associated with the set of solar panels 106 of the PV power plant 104. The sensor data 118 may include the real-time operating parameters associated with the PV power plant 104. In this context, the sensor data 118 may include for example, at least one of, but not limited to, the operational current parameter, the operational voltage parameter associated with the set of solar panels 106 of the PV power plant 104, the internal temperature of the inverter associated with the PV power plant 104, or the tilt angle of the one or more trackers associated with the set of solar panels 106 of the PV power plant 104. The internal temperature may be, for example, but not limited to, 40 degrees Celsius. The tilt angle may be one of but not limited to, for example, 20 degrees towards south, 25 degrees towards east, 25 degrees towards west or 30 degrees towards north-east. The one or more trackers may refer to one or more devices associated with the set of solar panels 106 that allow solar panels to follow the path of the sun in the sky, thereby maximizing the production of energy by PV power plants. Examples of each tracker of the one or more trackers may include one of, but not limited to, a fix tilt tracker, a single axis tracker, a dual axis tracker, or a multi-axis tracker.

In operation, the system 102 may be configured to obtain the first information. The first information may include the location information associated with the set of solar panels 106 of the PV power plant 104, the real-time weather information associated with the set of solar panels 106 of the PV power plant 104 and the configuration information associated with the set of solar panels 106 of the PV power plant 104. The location information may refer to information associated with the location of installation of the set of solar panels 106 of the PV power plant 104. The location information may include, for example, but not limited to, geographical coordinates of the installation site and an altitude of the installation site of the PV power plant 104. The real-time weather information may refer to information associated with real-time weather at the location of installation of the set of solar panels 106. The real-time weather information may include, for example, at least one of, but not limited to, an ultraviolet (UV) index at the location of installation of the set of solar panels 106, solar irradiance at the location of installation of the set of solar panels 106, a temperature at the location of installation of the set of solar panels 106, or humidity at the location of installation of the set of solar panels 106. The configuration information associated with the set of solar panels 106 may refer to information associated with an arrangement of the set of solar panels 106 within the PV power plant 104. The configuration information may include for example, but not limited to, an orientation of the set of solar panels 106 and an electrical configuration of the set of solar panels 106. The orientation of the set of solar panels 106 may refer to an orientation of installment of each solar panel of the set of solar panels 106. The electrical configuration of the set of solar panels 106 may include at least one of, but not limited to, a series configuration or a parallel configuration.

Thereafter, the system 102 may be configured to obtain the second information based on the obtained first information. The second information may include the real-time operating parameters associated with the PV power plant 104. The second information may be obtained from the set of sensors 108. Each sensor of the set of sensors 108 may be associated with the PV power plant 104. The real-time operating parameters may refer to real-time operating parameters of one or more components associated with the PV power plant 104. The real-time operating parameters may include, for example, at least one of, but not limited to the operational current parameter associated with the set of solar panels 106, the operational voltage parameter associated with the set of solar panels 106, the tilt angle of the one or more trackers associated with the set of solar panels 106 or the internal temperature of the inverter associated with the PV power plant 104. In an exemplary embodiment, the system 102 may be configured to obtain the operational current parameter from the set of current measuring sensors and the operational voltage parameters from the set of voltage measuring sensors.

Further, the system 102 may be configured to provide the obtained first information and the obtained second information as an input to the ML model 112. The ML model 112 may be a pre-trained model. The ML model 112 may be configured to predict the output indicative of the degradation loss associated with each solar panel of the set of solar panels 106 based on the first information and the second information. Further, the system 102 may determine the degradation loss associated with each solar panel of the set of solar panels 106 based on the output of the ML model 112. In an example, the system 102 may determine the degradation loss associated with each of the first solar panel 106A, the second solar panel 106B, up to the Nth solar panel 106N based on the output generated by the ML model 112.

The system 102 may be further configured to render the alert based on the determined degradation loss. The system 102 may be configured to render the alert as a notification on the user device 114 associated with the user 120. In an embodiment, the system 102 may be configured to compare the determined degradation loss associated with each solar panel of the set of solar panels with a pre-determined threshold loss and render the alert based on the comparison. The alert may include an identifier associated with the first solar panel 106A of the set of solar panels 106 when the determined degradation loss associated with the first solar panel 106A being greater than the pre-determined threshold loss. The pre-determined threshold loss may be for example, but not limited to, 4% decrease in performance of the PV power plant 104 due to the degradation loss associated with the first solar panel 106A. The identifier may include at least a location of installation of the first solar panel 106A and a percentage of degradation loss associated the first solar panel 106A. The percentage may be, for example, but not limited to, a 2% decrease in performance of the PV power plant 104.

As discussed above, the system 102 may further render the alert including the identifier associated with other solar panels of the set of solar panels 106 when the degradation loss associated with the other solar panels may be greater than the pre-determined threshold loss. The user 120 may then perform repairing or replacement of the set of solar panels 106 to maintain the efficiency of the PV power plant 104 based on the rendered alert. The user 120 may correspond to an operator associated with the PV power plant 104 who may be assigned a task to repair or replace the set of solar panels 106 based on the rendered alert.

In an alternate embodiment, the system 102 may be further configured to transmit one or more instructions to at least a set of robots or a set of user-devices based on the determined degradation loss. The one or more instructions may be associated with at least one of a repairing of at least one solar panel of the set of solar panels 106 or a replacement of at least one solar panel of the set of solar panels 106. The set of user devices may be associated with a set of operators associated with the PV power plant 104. The set of operators may be assigned the task to repair or replace the set of solar panels 106 based on the rendered alert. In an alternate embodiment, the one or more instructions may include one or more computer executable instructions associated with at least one of the repairing of at least one solar panel of the set of solar panels 106 or the replacement of at least one solar panel of the set of solar panels 106. Each of the set of robots may include one of, for example, but not limited to, a utility-scale robot, a commercial robot, or a residential robot.

FIG. 2 illustrates a block diagram 200 of the system of FIG. 1, in accordance with an embodiment of the disclosure. FIG. 2 is explained in conjunction with FIG. 1. In FIG. 2, there is shown the block diagram 200 of the system 102. The system 102 may include at least one processor 202 (referred to as a processor 202, hereinafter), at least one non-transitory memory 204 (referred to as a memory 204, hereinafter), an input/output (I/O) interface 206, and a network interface 208. The processor 202 may include modules, depicted as, an input module 202A, a machine learning model application module 202B, a determination module 202C, and an output module 202D. The processor 202 may be connected to the memory 204, and the I/O interface 206 through wired or wireless connections. Although in FIG. 2, it is shown that the system 102 includes the processor 202, the memory 204, and the I/O interface 206 however, the disclosure may not be so limiting and the system 102 may include fewer or more components to perform the same or other functions of the system 102. In an embodiment, the input module 202A and the output module 202D may be integrated within the I/O interface 206. In some embodiments, the input module 202A may receive input data (such as user inputs) and the output module 202D may produce outputs via the I/O interface 206.

In accordance with an embodiment, the system 102 may store data that may be generated by the modules while performing corresponding operations or may be retrieved from a database associated with the system 102, such as the one or more databases 110, or in the memory 204. For example, the data may include a first information 204A, a second information 204B, a reference information 204C, and a degradation loss 204D.

The processor 202 of the system 102 may be configured to obtain the first information 204A, obtain the second information 204B, input the obtained first information and the obtained second information to the ML model 112, determine the degradation loss 204D based on the output of ML model 112 and render the alert based on the determined degradation loss 204D. The processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining, and/or multithreading. Additionally, or alternatively, the processor 202 may include one or more processors capable of processing large volumes of workloads and operations to provide support for big data analysis. In an example embodiment, the processor 202 may be in communication with the memory 204 via a bus for passing information among components of the system 102.

For example, when the processor 202 may be embodied as an executor of software instructions, the instructions may specifically configure the processor 202 to perform the algorithms and/or operations described herein when the instructions are executed. However, in some cases, the processor 202 may be a processor-specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU), and logic gates configured to support the operation of the processor 202. The network environment, such as 100 may be accessed using the network interface 208 of the system 102. The network interface 208 may provide an interface for accessing various features and data stored in the system 102.

In some embodiments, the processor 202 may be configured to provide Internet-of-Things (IoT) related capabilities to users of the system 102 disclosed herein. The I/O interface 206 may provide an interface for accessing various features and data stored in the system 102. By incorporating these IoT related capabilities, for example, but not limited to include, real-time monitoring and data collection, performance optimization, remote access and control, and security and asset protection into the system 102 to improve the efficiency, reliability, and profitability of the solar energy systems, contributing to the overall growth and adoption of solar panel. The I/O interface 206 may provide the user interface for communication of the system 102 with the user.

The input module 202A of the processor 202 may be configured to obtain the first information 204A associated with the set of solar panels 106 of the PV power plant 104. The first information 204A may include the location information associated with the set of solar panels 106 of the PV power plant 104, the real-time weather information associated with the set of solar panels 106 of the PV power plant 104 and configuration information associated with the set of solar panels 106 of the PV power plant 104. In another embodiment, the input module 202A may be configured to obtain the second information 204B from the set of sensors 108 associated with the set of solar panels 106 of the PV power plant 104. The second information 204B may include the real-time operating parameters associated with the PV power plant 104. In an exemplary embodiment, the input module 202A may be configured to obtain the operational current parameter from the set of current measuring sensors of the set of sensors 108 associated with the set of solar panels 106. In an alternate exemplary embodiment, the input module 202A may be configured to obtain the operational voltage parameter from the set of voltage measuring sensors of the set of sensors 108.

In additional embodiments, the input module 202A may be configured to obtain the reference information 204C associated with the set of solar panels 106 from one or more sources based on the obtained second information 204B. The reference information 204C may include at least one of a commissioning date associated with the set of solar panels and the pre-determined threshold loss. The commissioning date of a solar panel of the set of solar panels 106 may refer to a date when the set of solar panels 106 may be installed or connected to the grid for energy production. The pre-determined threshold loss may correspond to a value up to which the degradation loss 204D associated with each solar panel of the set of solar panels 106 may be ignored. In an example, the commissioning date and the pre-determined threshold loss may be obtained via a user input from the user device 114. In an embodiment, the input module 202A may obtain the user input provided by the user 120 via the user device 114. In an example, the user 120 may change the value of the pre-determined threshold loss as desired by the PV power plant 104.

The machine learning model application module 202B of the processor 202 may be configured to apply the ML model 112 on the first information 204A, the second information 204B and the reference information 204C to generate the output. In an embodiment, the system 102 may provide the obtained first information 204A, the obtained second information 204B and the obtained reference information 204C to the ML model 112 as an input. The ML model 112 may then predict the output. The output may be indicative of the degradation loss 204D associated with each solar panel of the set of solar panels 106 of the PV power plant 104.

Specifically, the output of the ML model 112 may be a diagnostic chart indicative of one of an increase in the degradation loss 204D over a first time period, a decrease in the degradation loss 204D over the first time period, or no change in the degradation loss 204D over the first time period. The first time period may be greater than a predefined threshold time period. The predefined threshold time period may be, for example, at least 20 days. The first time period may be kept greater than the predefined threshold time period in order to accurately determine the degradation loss 204D. For example, during a short time-period, for example, 3 to 4 days, a reduced efficiency of the PV power plant 104 may not be primarily due to the degradation of the set of solar panels 106. The reduced efficiency of the PV power plant 104 during this brief time period may be due to effects of soiling on the set of solar panels 106. However, for the first time period, for example, during a course of 30 days, the set of solar panels 106 may be cleaned multiple times due to which the effects of soiling on the reduced efficiency of the PV power plant may be negligible. The system 102 may then accurately determine the degradation loss 204D based on the reduced efficiency of the PV power plant 104 excluding the effects of the soiling on the set of solar panels 106.

The determination module 202C of the processor 202 is configured to determine the degradation loss 204D associated with each solar panel of the set of solar panels 106 based on the output of the ML model 112. In an example, the system 102 may be configured to determine the degradation loss 204D based on the diagnostic chart outputted by the ML model 112. The system 102 may determine the degradation loss 204D based on calculation of a gradient of a curve corresponding to the degradation loss 204D in the diagnostic chart. In an alternate example, the system 102 may determine the degradation loss 204D in terms of a percentage of the reduced efficiency of the PV power plant 104 due to degradation of the set of solar panels 106. The percentage of reduced efficiency of the PV power plant 104 due to degradation of the set of solar panels 106 may be, for example, but not limited to 2%, or 3%.

The output module 202D of the processor 202 may be configured to render the alert based on the determined degradation loss 204D for repairing or replacement of the set of solar panels 106. The output module 202D may be configured to output the alert based on the determined degradation loss 204D associated with each solar panel of the set of solar panels 106. The alert may be rendered on the user device 114 for repairing or replacement of the set of solar panels 106. In another embodiment, the output module 202D of the system 102 may be configured to render the diagnostic chart generated by the ML model 112. The diagnostic chart may inform the user 120 about the degradation loss 204D. The user 120 may then perform repairing or replacement of the set of solar panels 106 based on the degradation loss 204D.

The memory 204 of the system 102 may be configured to store the first information 204A, the second information 204B, the reference information 204C and the degradation loss 204D. The memory 204 may be non-transitory and may include, for example, one or more volatile and/or non-volatile memories. In other words, for example, the memory 204 may be an electronic storage device (for example, a computer readable storage medium) including gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA, or the like, the processor 202 may be specifically configured hardware for conducting the operations described herein.

The first information 204A may include the location information associated with the set of solar panels 106 of the PV power plant 104, the real-time weather information associated with the set of solar panels 106 of the PV power plant 104 and configuration information associated with the set of solar panels 106 of the PV power plant 104. The location information may correspond to the information associated with the location of installment of the set of solar panels 106. The location information may include, for example, but not limited to, the geographical coordinates of the installation site and the altitude of the installation site of the PV power plant 104. The configuration information may correspond to the information associated with the arrangement of the components associated with the set of solar panels 106. The configuration information may include for example, but not limited to, the orientation of the set of solar panels 106, a type of solar panel, dimensions of the set of solar panels 106, the electrical configuration of the set of solar panels 106, and the like. The orientation of the set of solar panels 106 may refer to the orientation of installment of each solar panel of the set of solar panels 106. The electrical configuration of the set of solar panels 106 may include at least one of, but not limited to, the series configuration or the parallel configuration.

The real-time weather information may refer to the information associated with the real-time weather at the location of installation of the set of solar panels 106. In an embodiment, the real-time weather information associated with the location of the set of solar panels 106 may include at least one of the ultraviolet (UV) index at the location of the set of solar panels 106, solar irradiance at the location of the set of solar panels 106, a wind speed at the location of the set of solar panels 106, a wind direction at the location of the set of solar panels 106, an ambient temperature at the location of the set of solar panels 106, solar irradiance at a front plane of the set of solar panels, solar irradiance at a rear plane of the set of solar panels 106, a temperature of the set of solar panels 106, or a humidity at the location of the set of solar panels 106.

The UV index at the location of the set of solar panels 106 may refer to a measure of intensity of ultraviolet (UV) radiation from the sun at the location of installation of the set of solar panels 106. The solar irradiance at the location of the set of solar panels 106 corresponds to intensity of light at the location of the set of solar panels 106. The ambient temperature refers to the real time air temperature at the location of the set of solar panels 106. In one or more examples, the UV index at the location of the set of solar panels may be, for example, in a range of, but not limited to, 3 to 5. The UV index of greater than 8 may be considered harmful and may lead to degradation of the set of solar panels 106 of the PV power plant. The solar irradiance of the location of the set of solar panels may be for example, but not limited to, 7 $kWh/m^2$ per day. The ambient temperature may be for example, but not limited to, 35 degrees Celsius. The wind speed may be for example, but not limited to, 6 miles per hour. The wind direction may be for example, but not limited to, the north-east. The temperature of the solar panels may be for example, but not limited to, 35 degrees Celsius. The humidity at the location of the set of solar panels 106 may be for example, but not limited to, 34%. In an embodiment, the system 102 may be configured to obtain the real-time weather information of the location from one or more sources that may include real-time satellite-based weather monitoring systems.

The second information 204B may include the real-time operating parameters associated with the PV power plant 104. In an embodiment, the real-time operating parameters may include the operational current parameter associated with the set of solar panels 106, the operational voltage parameter associated with the set of solar panels 106, the tilt angle of the one or more trackers associated with the set of solar panels 106, and the internal temperature of the inverter associated with the PV power plant 104. In an embodiment, the real-time operating parameters may be obtained from the set of sensors 108. Accordingly, the set of sensors 108 may include, for example, but not limited to, the set of current measuring sensors, the set of voltage measuring sensors, the set of motion sensors, and the set of temperature measuring sensors as described in FIG. 1.

The reference information 204C may include at least one of the commissioning date associated with the set of solar panels 106 or the pre-determined threshold loss. The pre-determined threshold loss associated with the set of solar panels 106 may include a specific degradation loss value or rate over which the degradation of the set of solar panels 106 may lead to significant decrease in efficiency of the PV power plant 104 and may cause economic losses to the PV power plant 104. The pre-determined threshold loss may correspond to the value up to which the degradation loss 204D may be ignored. The pre-determined threshold loss may be, for example, but not limited to 2% reduced efficiency of the PV power plant 104.

In an embodiment, the pre-determined threshold loss may further be in a range, for example, but not limited to, 2% to 10%. A lower limit in the range, for example, 2% may correspond to the value up to which the degradation loss 204D may be ignored. The repairing of at least one solar panel of the set of solar panels 106 may be performed based on when the degradation loss 204D associated with the at least one solar panel may be greater than the lower limit in the range, for example 2% but lesser than an upper limit in the range, for example 10%. The replacement of at least one solar panel of the set of solar panels 106 may be performed based on when the degradation loss 204D associated with the at least one solar panel may be even greater than the upper limit in the range, for example 10%. The commissioning date of the set of solar panels 106 may refer to the date when the set of solar panels 106 may be installed or connected to the grid for energy production by the PV power plant 104. In an example, the reference information 204C may be obtained from the user 120 as the user input via the user device 114.

In an alternate embodiment, the pre-determined threshold loss may be determined based on the commissioning date of the set of solar panels 106. The pre-determined threshold loss may be determined based on time since the commissioning date of the set of solar panels 106. In an embodiment, the pre-determined threshold may increase with the increase in time since the commissioning date of the set of solar panels 106. As an example, the pre-determined threshold loss up to one year from the commissioning date of the set of solar panels 106 may be, but not necessarily, 1%. As another example, the pre-determined threshold loss from one year to two years from the commissioning date of the set of solar panels 106 may be, but not necessarily, 1.5%. As yet another example, the pre-determined threshold loss from two years to three years from the commissioning date of the set of solar panels 106 may be, but not necessarily, 1.8%.

The degradation loss 204D may include the determined degradation loss associated with each solar panel of the set of solar panels 106 of the PV power plant 104. The degradation loss 204D may correspond to a decrease in efficiency of the PV power plant 104 due to the degradation of the set of solar panels 106 with due course of time. The degradation of the set of solar panels 106 may be caused due to various factors for example, but not limited to, exposure to ultraviolet (UV) rays, temperature fluctuations, and adverse weather conditions. The impacts of degradation loss 204D may include reduced energy output, financial losses, increased maintenance costs, and the like. The system 102 may utilize the degradation loss 204D to render the alert for repairing or replacement of each solar panel of the set of solar panels 106 associated with the PV power plant 104. In an exemplary embodiment, the system 102 may schedule future repairing and maintenance cycles of each solar panel of the set of solar panels 106 based on the determination of the degradation loss 204D.

In some example embodiments, the I/O interface 206 may communicate with the system 102 and display the input and/or output of the system 102. As such, the I/O interface 206 may include a display and, in some embodiments, may also include a keyboard, a mouse, a joystick, a touch screen, touch areas, soft keys, one or more microphones, a plurality of speakers, or other input/output mechanisms. In one embodiment, the system 102 may include a user interface circuitry configured to control at least some functions of one or more I/O interface elements such as a display and, in some embodiments, a plurality of speakers, a ringer, one or more microphones and/or the like. The processor 202 and/or I/O interface 206 circuitry including the processor 202 may be configured to control one or more functions of one or more I/O interface 206 elements through computer program instructions (for example, software and/or firmware) stored on a memory 204 accessible to the processor 202.

The network interface 208 may include input interface and output interface for supporting communications to and from the system 102 or any other component with which the system 102 may communicate. The network interface 208 may be any means such as a device or circuitry embodied in either hardware or a combination of hardware and software that is configured to receive and/or transmit data to/from a communications device in communication with the system 102. In this regard, the network interface 208 may include, for example, an antenna (or multiple antennae) and supporting hardware and/or software for enabling communications with a wireless communication network. Additionally, or alternatively, the network interface 208 may include the circuitry for interacting with the antenna(s) to cause transmission of signals via the antenna(s) or to handle receipt of signals received via the antenna(s). In some environments, the network interface 208 may alternatively or additionally support wired communication. As such, for example, the network interface 208 may include a communication modem and/or other hardware and/or software for supporting communication via cable, digital subscriber line (DSL), universal serial bus (USB) or other mechanisms.

FIG. 3 is a block diagram 300 that illustrates exemplary operations for determination of degradation loss on the set of solar panels 106 of the PV power plant 104, in accordance with an embodiment of the disclosure. FIG. 3 is explained in conjunction with elements from FIG. 1 and FIG. 2. With reference to FIG. 3, there is shown the block diagram 300 that illustrates exemplary operations from 302 to 312, as described herein. The exemplary operations illustrated in the block diagram 300 may start at 302 and may be performed by any computing system, apparatus, or device, such as by the system 102 of FIG. 1 or the processor 202 of FIG. 2. Although illustrated with discrete blocks, the exemplary operations associated with one or more blocks of the block diagram 300 may be divided into additional blocks, combined into fewer blocks, or eliminated, depending on the implementation.

At 302, a data acquisition operation may be performed. In an embodiment, the system 102 may be configured to obtain the first information 204A. The first information 204A may include the location information associated with the set of solar panels 106 of the PV power plant 104, the real-time weather information associated with the set of solar panels 106 of the PV power plant 104 and the configuration information associated with the set of solar panels 106 of the PV power plant 104. In an embodiment, the system 102 may be configured to obtain the location information. The location information may refer to the information associated with the location of installation of the set of solar panels 106. The location information may include, for example, but not limited to, the geographical coordinates of the installation site of the PV power plant 104 and the altitude of the installation site of the PV power plant 104. In an exemplary embodiment, the system 102 may obtain the geographical co-ordinates of the location of installation of the set of solar panels 106. The system 102 may further be configured to obtain the location information from a map database or a satellite-based global positioning system (GPS).

In another embodiment, the system 102 may be configured to obtain the real-time weather information of the location of installation of the set of solar panels 106. The real-time weather information may refer to the information associated with the real-time weather at the location of installation of the set of solar panels 106. The real-time weather information may include at least one of the UV index at the location of installation of the set of solar panels, solar irradiance at the location of the set of solar panels 106, the wind speed at the location of the set of solar panels 106, the wind direction at the location of the set of solar panels 106, the ambient temperature at the location of the set of solar panels 106, the solar irradiance at the front plane of the set of solar panels 106, the solar irradiance at the rear plane of the set of solar panels 106, the temperature of the set of solar panels 106, or the humidity at the location of the set of solar panels 106.

In an exemplary embodiment, the system may obtain the real-time weather information from the real-time satellite-based weather monitoring systems. For example, the system 102 may be configured to perform the data acquisition operation to obtain the real-time UV index of the location of installation of the set of solar panels 106 from the real-time satellite-based weather monitoring systems. The real-time UV index at the location of the set of solar panels 106 may be for example, but not limited to, 3. The UV index of greater than 8 may be considered harmful and may lead to degradation of the set of solar panels 106 of the PV power plant. The UV index of greater than 8 consistently at a location may refer that the UV index at that location may be considerably high and that location may be unsuitable for installation of the PV power plant 104.

In another embodiment, the system 102 may be configured to obtain the configuration information. The configuration information may refer to the information associated with the arrangement of the components associated with the set of solar panels 106. The configuration information may include for example, but not limited to, the orientation of the set of solar panels 106 and the electrical configuration of the set of solar panels 106. The orientation of the set of solar panels 106 may refer to the orientation of installment of each solar panel of the set of solar panels 106. The electrical configuration may include, for example, at least one of, but not limited to, a series configuration or a parallel configuration. In an exemplary embodiment, the system 102 may further be configured to obtain the configuration information from the user 120 via the user input. For example, the system may obtain the orientation of the installment of each solar panel of the set of solar panels 106. The orientation of one solar panel from the set of solar panel 106 may be for example, but not limited to, 30 degrees north-east.

In another embodiment, the system 102 may further be configured to obtain the second information 204B. The second information 204B may include the real-time operating parameters of the PV power plant 104. The real-time operating parameters may include at least one of the operational current parameter associated with the set of solar panels 106, the operational voltage parameter associated with the set of solar panels 106, the tilt angle of the one or more trackers associated with the set of solar panels 106, and the internal temperature of the inverter associated with the PV power plant 104. In an embodiment, the system may be configured to obtain the second information 204B from the set of sensors 108 associated with the set of solar panels 106 of the PV power plant.

In an exemplary embodiment, the system 102 may be configured to obtain the operational voltage parameter associated with the set of solar panels 106 from the set of voltage measuring sensors. The system 102 may further obtain the operational current parameter associated with the set of solar panels 106 from the set of current measuring sensors. The system 102 may further obtain the internal temperature of the inverter associated with the PV power plant 104 from the set of temperature measuring sensors. The internal temperature may be for example, but not limited to, 40 degrees Celsius. The system 102 may further obtain the tilt angle of the one or more trackers from the set of motion sensors. The tilt angle may be one of but not limited to, for example, 20 degrees towards south, 25 degrees towards east, 25 degrees towards west or 30 degrees towards north-east. Examples of each of the one or more trackers may include one of, but not limited to, a fix tilt tracker, a single axis tracker, a dual axis tracker, or a multi-axis tracker.

In another embodiment, the first information 204A and the second information 204B associated with the set of solar panels 106 may be obtained for the first time period. The first time period may be greater than the predefined threshold time period. The predefined threshold time period may be, for example, at least 30 days. The first time period may be kept greater than the predefined threshold time period in order to accurately determine the degradation loss 204D. Accordingly, the first information 204A and the second information 204B may be obtained for the first time period for the accurate determination of the degradation loss 204D. For example, during a short time-period, for example, 3 to 4 days, the reduced efficiency of the PV power plant 104 may not be primarily due to the degradation of the set of solar panels 106. The reduced efficiency of the PV power plant 104 during this brief time period may also include the effects of soiling on the set of solar panels 106. However, for the first time period, for example, during a course of 30 days, the set of solar panels 106 may be cleaned multiple times due to which the effects of soiling on the decrease in efficiency of the PV power plant may be negligible. The system 102 may then accurately determine the degradation loss 204D based on the decrease in efficiency of the PV power plant 104 excluding the effects of soiling on the set of solar panels 106.

In an additional embodiment, the system 102 may be configured to obtain cleaning frequency data associated with the set of solar panels 106. The cleaning frequency data may include information associated with a cleaning frequency of the set of solar panels 106. The cleaning frequency data may be obtained from one or more sources. In an exemplary embodiment, the cleaning frequency data may be obtained from the user 120 as the user input via the user device 114. In an alternate exemplary embodiment, the cleaning frequency data may be obtained based on a textual analysis of the data included in manual cleaning logbooks that may be associated with cleaning of the set of solar panels 106. Such manual cleaning logbooks may correspond to handwritten notes indicating a date and time of the cleaning of the set of solar panels 106 by the set of operators. In yet another alternate exemplary embodiment, the cleaning frequency data may be obtained from one or more robots associated with performing the cleaning tasks of the set of solar panels 106.

In another embodiment, the system 102 may be configured to obtain the reference information 204C associated with the set of solar panels 106 from one or more sources. The reference information 204C may include at least one of the commissioning date associated with the set of solar panels 106 and the pre-determined threshold loss as described in FIG. 2. The commissioning date may refer to the date when the set of solar panels 106 may be connected to the grid for production of electricity. In an exemplary embodiment, the system 102 may obtain the reference information 204C from the user 120 via the user input. The user 120 may provide the user input via the user device 114. In an exemplary embodiment, the reference information 204C may include a reference electric power generated by the PV power plant 104. The system 102 may utilize the reference electric power for the determination of degradation loss 204D. The system 102 may compare the reference electric power with a real-time electric power of the PV power plant 104 to determine the degradation loss 204D. The reference electric power may refer to power generated by each solar panel of the set of solar panel 106 on the commissioning date, when the set of solar panels 106 may be connected to the grid for the production of electricity. The electric power generated by each solar panel of the set of solar panels 106 may be, for example, 100 watts.

In another embodiment, the system 102 may be configured to validate the first information 204A and the second information 204B associated with the set of solar panels 106. The system 102 may validate the first information 204A and the second information 204B based on application of one or more data validation techniques. The data validation may refer to a process of ensuring the accuracy and quality of data and may be performed on the first information 204A and the second information 204B to identify and remove any kinds of inconsistencies and inaccuracies. The validated first information 204A and the validated second information 204B may then be stored into the one or more databases 110 for determining the degradation loss 204D.

The one or more data validation techniques may include for example, but not limited to, format checks and consistency checks. The format checks may refer to a procedure to check that a data format of the first information 204A and the data format of the second information 204B may be properly maintained. The consistency checks may refer to a procedure to identify and remove redundancies in the first information 204A and the second information 204B. For example, the system 102 may perform the format checks and consistency checks on the first information 204A and the second information 204B to check whether measurement units of the temperature of the set of solar panels 106 are consistent or not. For example, if the temperature obtained from the first sensor 108A may be in degree Celsius and the temperature obtained from the second sensor 108B may be in degree Kelvin, then the system 102 may be configured to convert the temperature obtained in degrees Kelvin to degree Celsius to maintain consistency.

In another embodiment, the system 102 may be configured to normalize the validated first information 204A and the validated second information 204B. The process of data normalization may include organizing data to appear similar across all records and fields. The system 102 may be configured to perform the normalization of the validated first information 204A and the validated second information 204B to organize the validated first information 204A and the validated second information 204B based on application of the one or more normalization techniques, which may include, for example, but not limited to, decimal place normalization technique, data type normalization technique, and Z-score normalization technique. The system 102 may then be configured to store the normalized data in the one or more databases 110. Details about the data normalization techniques are known in the art and have been omitted for the sake of brevity.

At 304, the machine learning model application operation may be performed. In an embodiment, the system 102 may apply the ML model 112 on the first information 204A, the second information 204B and the reference information 204C to predict the output. The system 102 may be configured to provide the first information 204A, the second information 204B and the reference information 204C as the input to the ML model 112. The ML model 112 may perform predictive analysis on the obtained first information 204A, the obtained second information 204B and the obtained reference information 204C and generate the output indicative of the degradation loss 204D associated with each solar panel of the set of solar panels 106. In an additional embodiment, the system 102 may provide the validated first information and the validated second information to the ML model 112 The system 102 may be configured to apply the ML model 112 on the validated first information 204A and the validated second information 204B to predict the output indicative of the degradation loss 204D.

The ML model 112 may then be configured to predict the output indicative of the degradation loss 204D based on the first information 204A, the second information 204B and the reference information 204C. In an embodiment, the output of the ML model 112 may be the diagnostic chart indicative of one of the increase in the degradation loss 204D for the first time period, the decrease in the degradation loss 204D for the first time period, or no change in the degradation loss 204D for the first time period.

In an additional embodiment, the system 102 may apply the ML model 112 on the first information 204A, the second information 204B and the reference information 204C based on the obtained cleaning frequency data. As an example, the system 102 may apply the ML model 112 on the day when the cleaning of the set of solar panels 106 is performed. As another example, the system 102 may apply the ML model 112 on the day just after the day on which the cleaning of the set of solar panels 106 might have been performed. In this context, the system 102 may ensure that the decrease in efficiency of the PV power plant 104 during the first time period may be due to degradation loss 204D and may not include the effects of soiling. Specifically, the system 102 may ensure that the decrease in the real time operating parameters of each solar panel of the set of solar panels 106 may be due to degradation loss 204D and may not include the effects of soiling.

In an exemplary embodiment, the ML model 112 may be configured to determine the reduced efficiency of the PV power plant 104 based on comparing the reference information 204C with the second information 204B. Since reduced efficiency may be determined for the first time period which may help in eliminating the effects of soiling on the determination of degradation loss 204D as described earlier. The ML model 112 may determine the reduced efficiency of the PV power plant 104 due to the degradation loss 204D. The percentage of reduced efficiency of the PV power plant 104 due to the degradation loss 204D may be for example, but not limited to, 2%, 3%, 4%, or 5%. The ML model 112 may then determine the diagnostic chart based on the reduced efficiency of the PV power plant 104 due to the degradation loss 204D.

In yet another additional embodiment, the diagnostic chart may correspond to a heatmap associated with the PV power plant 104. The heatmap may indicate the distribution of degradation loss 204D over the PV power plant 104. Specifically, the heatmap may indicate the variation in degradation loss 204D over each solar panel of the set of solar panels 106 by a variation in intensity of color of one or more regions. The one or more regions in the heatmap may correspond to one or more solar panels of the set of solar panels 106 and the intensity of the color of the one or more solar panels may indicate the degradation loss associated with each of the one or more solar panels. Details about the heatmap are further provided in FIG. 7.

At 306, the degradation loss determination operation 306 may be performed. In an embodiment, the system 102 may be configured to determine the degradation loss 204D associated with each solar panel of the set of solar panels 106 based on the output of the ML model 112. The degradation loss 204D may correspond to the reduced efficiency of the PV power plant 104 due to the degradation of the set of solar panels 106 with due course of time. The degradation of the set of solar panels 106 may be caused due to various factors for example, but not limited to, exposure to ultraviolet (UV) rays, temperature fluctuations, and adverse weather conditions. In an embodiment, the system 102 may determine the degradation loss 204D based on the output of the ML model 112, which may be the diagnostic chart. In an exemplary embodiment, the system 102 may calculate the gradient of the curve in the diagnostic chart to determine the degradation loss 204D.

In an alternate exemplary embodiment, the system 102 may also determine the degradation loss 204D in terms of the reduced efficiency of the PV power plant 104 due to the degradation loss 204D. The ML model 112 may determine the reduced efficiency of the PV power plant 104 due to the degradation loss 204D and predict the output. The system 102 may utilize the output to determine the degradation loss 204D in terms of the percentage of reduced efficiency. The percentage of reduced efficiency of the PV power plant 104 due to the degradation loss 204D may be at least one of, for example, but not limited to, 1%, 2%, 3%, 4%, 5% or 6%.

At 308, it may be determined whether the degradation loss 204D is greater than the pre-determined threshold loss. In an embodiment, the system 102 may be configured to compare the determined degradation loss associated with each solar panel of the set of solar panels 106 with the pre-determined threshold loss. The system 102 may then determine whether the degradation loss 204D may be greater than the pre-determined threshold loss.

In an embodiment, the system 102 may iteratively compare the degradation loss 204D associated with each of the first solar panel 106A, the second solar panel 106B, up to the Nth solar panel with the pre-determined threshold loss. The system 102 may then determine whether the degradation loss associated with each solar panel may be greater than the threshold based on the comparison. For example, the pre-determined threshold loss after three years from the commissioning date of the set of solar panels 106 may be 1.8% and the degradation loss associated with the solar panel after three years from the commissioning date may be 2%, then the system 102 may determine that the degradation loss 204D may be greater than the pre-determined threshold loss by 0.2% and the control may be transferred to 310. Otherwise, the control may be transferred to end at 312.

At 310, an alert generation operation may be performed. In an embodiment, the system 102 may be configured to generate the alert based on the determined degradation loss 204D. The alert may be generated by the system 102 based on when the degradation loss 204D associated with at least one solar panel of the set of solar panels 106 may be greater than the pre-determined threshold loss. The system 102 may then generate the alert for the user 120 to perform one of repairing or replacement of the at least one solar panel of the set of solar panels 106 based on the comparison.

In another embodiment, the alert may include the identifier associated with the first solar panel 106A based on when the degradation loss 204D associated with the first solar panel 106A may be greater than the pre-determined threshold loss. The identifier may include at least the location of installation of the first solar panel 106A and the percentage of degradation loss associated with the first solar panel 106A. The percentage of degradation loss may be, for example, but not limited to, 2%.

At 312, based on the determined degradation loss 204D associated with each solar panel of the set of solar panels 106 being less than the pre-determined threshold loss the operations of the block diagram 300 may end at 312.

At 314, the alert rendering operation may be performed. In an embodiment, the system 102 may be configured to render the alert based on the determined degradation loss 204D. The system 102 may be configured to render the alert on the user device 114 to notify the user 120 for performing one of the repairs or replacement of the set of solar panels 106. The system 102 may be configured to render the alert based on the comparison. The system 102 may render the alert based on when the degradation loss 204D associated with the at least one solar panel of the set of solar panels 106 may be greater than the pre-determined threshold loss.

In another embodiment, the system 102 may be configured to render the alert including the identifier associated with the first solar panel based on the comparison. The system 102 may render the alert based on when the degradation loss 204D associated with the first solar panel 106A may be greater than the pre-determined threshold loss. Accordingly, the system 102 may render the alert for each solar panel of the set of solar panels for which the degradation loss 204D may be greater than the pre-determined threshold loss. The user 120 may then perform the repair of the set of solar panels 106 or replace the set of solar panels 106 to maintain the efficiency of the PV power plant 104.

In another embodiment, the processor 202 of the system 102 may be configured to transmit the one or more instructions associated with one of the repair of the set of solar panels 106 or the replacement of the set of solar panels 106 to a set of robots or a set of user devices based on the determined degradation loss 204D. In an embodiment, the set of user devices may be associated with a set of operators associated with the PV power plant 104. The set of operators may perform the repairing or the replacement of the set of solar panels 106 based on the one or more instructions. In one or more examples, the one or more instructions may include one or more computer executable instructions for performing the repairing and replacement of the set of solar panels 106 by the set of robots. Specifically, the system 102 may transmit the one or more instructions to the set of robots to control the set of robots for automated repairing or automated replacement of the set of solar panels 106 of the PV power plant 104. The set of robots may then perform the repairing or the replacement of the set of solar panels 106 based on the one or more instructions. Each robot of the set of robots may be one of a utility-scale robot, a commercial robot or a residential robot.

In another embodiment, the system 102 may be configured to render the output of the ML model 112 on the user device 114. Specifically, the system 102 may be configured to render the diagnostic chart depicting one of the increase in degradation loss 204D for the first time period, the decrease in degradation loss 204D for the first time period, or no change in degradation loss 204D for the first time period on the user device 114. Further, the system 102 may render one or more recommendations along with the diagnostic chart. The decrease in degradation loss 204D for the first time period may indicate a potential issue with the data collected from these set of sensors 108 by the system 102. In that case, the system 102 may render the message on the user device 114 to notify the user 120 to check the calibration of components and the set of sensors 108 or to replace the components and/or the set of sensors 108. The increase in degradation loss 204D over the first time period may indicate the degradation loss 204D being greater than the pre-determined threshold loss. In that case, the system 102 may compare the degradation loss 204D with the pre-determined threshold loss and render the recommendation associated with one of the repairing or the replacement of the set of solar panels 106 accordingly as described earlier. The no change in degradation loss 204D over the first time period in the diagnostic chart may indicate the degradation loss 204D is constant over the first timer period and less than the pre-determined threshold loss. In such a case, a recommendation may be rendered including a message indicating that the degradation loss 204D may be lesser than the pre-determined threshold loss and the repairing or replacement of the set of solar panels 106 may not be required.

In another embodiment, the system 102 may further be configured to render the heatmap on the user device 114. The heatmap may be rendered on the user device 114 to indicate a distribution of the degradation loss over the PV power plant 104 to the user 120. In additional embodiment, the diagnostic chart may correspond to the heatmap associated with the PV power plant 104. The heatmap may further include the degradation loss 204D associated with each solar panel (such as the first solar panel 106A, the second solar panel 106B, and the Nth solar panel 106N) of the set of solar panels 106. The heatmap may indicate a variation of the degradation loss 204D with the variation in intensity of colours or the variation in patterns. Details about the heatmap are further explained in FIG. 6.

In one or more embodiments, the system 102 may be configured to render one or more charts on the user device 114. The one or more charts may include one or more repair schedules or one or more replacement schedules of each solar panel of the set of the solar panels 106. In an embodiment, the system 102 may be configured to generate one or more charts indicating the one or more repairing schedules of each solar panel of the set of solar panels 106. The one or more charts may be used for scheduling future repairing cycles of set of solar panels 106 of the PV power plant 104. The one or more charts may further be used for procuring a new solar panels in advance for a future replacement of the set of solar panels 106 of the PV power plant 104. For example, the one or more charts may indicate that there may be a need to replace the first solar panel 106A in the upcoming month, then the operator of the PV power plant may order a new solar panel in advance for the replacement to avoid any delays in future.

The one or more charts may further include a sequence order of repairing each solar panels of the set of solar panels. For example, the degradation loss 204D associated with the set of solar panels 106 may be in a decreasing order from the first solar panel 106A to the Nth solar panel 106N. The degradation loss 204D associated with the first solar panel 106A may be higher than the degradation loss 204D associated with the second solar panel and so on up to the Nth solar panel. In that case, the one or more charts may include the sequence order for repairing the first solar panel 106A as the first to be repaired and the Nth solar panel 106N to be the last one to be repaired. The one or more charts may be displayed to the user 120 via the user device 114 for repairing each solar panel of the set of solar panels 106. In additional embodiments, the system 102 may be configured to generate the one or more charts indicative of the degradation loss 204D based on the obtained first information 204A, obtained second information 204B, the determined degradation loss 204D, and a training dataset associated with historical degradation loss events. The ML model 112 may be pre-trained on the training dataset.

FIG. 4 is a block diagram that illustrates a block diagram depicting training an exemplary machine learning model on training data for determination of degradation loss, in accordance with an exemplary embodiment of the disclosure. FIG. 4 is explained in conjunction with elements from FIG. 1, FIG. 2 and FIG. 3. With reference to FIG. 4, there is shown the block diagram 400 including the system 102, the ML model 112, training data 402, and the degradation loss 204D.

The training data 402 may refer to a training dataset that may be associated with historical degradation loss events associated with the set of solar panels 106 of the PV power plant 104. The training dataset may be utilized by the system 102 to pre-train the ML model 112. The training data 402 may include input data and corresponding output data. The input data and the corresponding output data may be associated with historical degradation loss events associated with the set of solar panels 106 of the PV power plant 104 or any other power plant in the same geographical region as that of the PV power plant 104. The output data may include the degradation loss 204D corresponding to the first information 204A, the second information 204B and the reference information 204C for each historical degradation loss event.

The system 102 may be configured to provide the training data 402 to the ML model 112. The ML model 112 may determine a machine learning algorithm for prediction of the degradation loss 204D based on the training data 402. In an exemplary embodiment, the ML model 112 may determine a mathematical representation of the relationship between the input data and the corresponding output data to determine the machine learning algorithm for determining the degradation loss 204D based on the first information 204A, the second information 204B and the reference information 204C. This process of feeding the machine learning algorithm with training data is referred to as model training. Details about the training of the ML model 112 is known in the art and has been omitted for the sake of brevity.

Based on the training data, the ML model 112 may be configured to predict the degradation loss 204D using the obtained first information 204A, the obtained second information 204B and the obtained reference information 204C. The ML model 112 may then be configured to predict the output, which may be indicative of the determined degradation loss 204D associated with each solar panel of the set of solar panels 106 based on the first information 204A, the second information 204B and the reference information 204C.

FIG. 5 is a diagram that illustrates an exemplary alert associated with the degradation loss, in accordance with an embodiment of the disclosure. FIG. 5 is explained in conjunction with FIG. 1, FIG. 2, FIG. 3, and FIG. 4. With reference to FIG. 5, there is shown an electronic device 502 that renders an alert 504 associated with the degradation loss. The electronic device 502 may be an exemplary embodiment of the user device 114 of FIG. 1.

The electronic device 502 may include suitable logic, circuitry, interfaces, and/or code to output the alert 504 that may be generated by the system 102. In an embodiment, the system 102 may be configured to output the alert 504 on the electronic device 502 based on the determined degradation loss 204D. The alert 504 may be indicative of the determined degradation loss 204D. As shown in FIG. 5, the degradation loss due to excessive degradation of the first solar panel 106A may be 3%. In addition to the determined degradation loss, the system 102 may be further configured to output one or more recommendations to overcome or decrease the degradation loss. As shown in FIG. 5, the recommendation may be to urgently repair the first solar panel 106A.

In an embodiment, the alert 504 may include the identifier associated with the first solar panel 106A based on when the degradation loss 204D associated with the first solar panel 106A may be greater than the pre-determined threshold loss. In this context, with reference to FIG. 5, the identifier may refer to the location "XYZ" of the first solar panel 106A. The alert 504 may further include the degradation loss associated with each solar panel of the set of solar panels 106. In this context, with reference to FIG. 5, the rendered alert 504 may include the percentage of degradation loss 204D associated with the first solar panel 106A, which may be, for example, 3%. In an exemplary embodiment, the degradation loss 204D associated with the first solar panel 106A after three years from the commissioning date of the first solar panel 106A may be 3% and the pre-determined threshold after three years from the commissioning date of the set of solar panels 106 may be 1.8%, then the system 102 may render the alert 504 for repairing or replacement of the first solar panel 106A.

In another embodiment, the rendered alert 504 further includes one or more recommendations associated with one of repairing of the set of solar panels 106 or the replacement of the set of solar panels 106. Since the determined degradation loss 204D associated with the first solar panel 106A may be greater than the lower limit of the range corresponding to the pre-determined threshold loss, for example, 2% but lesser than the upper limit, for example, 10%, the alert 504 may include the recommendation associated with the repairing of the first solar panel 106A as described earlier in FIG. 3. In this context, with reference to FIG. 5, the rendered alert may include a recommendation to repair the first solar panel 106A. In an example, the rendered alert 504 may further include, for example, a date on which the alert may be generated, and a time at which the alert may be generated.

In an additional embodiment, the alert 504 may further include the diagnostic chart and the heatmap generated by the ML model 112 for indicating the degradation loss 204D. The system 102 may utilise the electronic device 502 to output the alert, the diagnostic chart, and the heatmap to the user 120 for repairing of the set of solar panels 106 or the replacement of the set of the solar panels 106. In another additional embodiment, the alert 504 may further include the one or more charts indicative of the degradation loss 204D, which generated by the system 102. The one or more charts may represent one of the future repairing cycles of the set of solar panels 106 or the future replacement cycles of the set of solar panels 106.

FIG. 6 is a diagram that illustrates an exemplary heatmap depicting degradation loss on solar panels of the photovoltaic power plant, in accordance with an embodiment of the disclosure. FIG. 6 is explained in conjunction with FIG. 1, FIG. 2, FIG. 3, FIG. 4, and FIG. 5. With respect to FIG. 6, there is shown the diagram 600 including a PV power plant 602, and a heatmap 604 associated with the PV power plant 602. The heatmap 604 may further include a first region 604A, a second region 604B, a third region 604C and a fourth region 604D. The PV power plant 602 is an exemplary embodiment of the PV power plant 104 of FIG. 1.

The heatmap 604 may indicate the distribution of degradation loss 204D over the PV power plant 602. The heatmap 604 may indicate the variation in degradation loss 204D across each solar panel of the set of solar panels of the PV power plant 602 by the variation in intensity of color or patterns of the one or more regions. In an embodiment, the diagnostic chart may correspond to the heatmap 604 associated with the PV power plant 104. The heatmap 604 may indicate the distribution of the degradation loss 204D over the PV power plant 104. The heatmap 604 may indicate the degradation loss 204D associated with each solar panel of the set of solar panels of the PV power plant 602. The heatmap 604 may further include the first region 604A associated with a first solar panel of the PV power plant 602, the second region 604B associated with a second solar panel of the PV power plant 602, the third region 604C associated with a third solar panel of the PV power plant 602 and the fourth region 604D associated with a fourth solar panel associated with the PV power plant 602.

In an embodiment, the first region 604A may include a greater intensity of colour (or a first pattern) in the heatmap 604 compared to the intensity of colour (or a second pattern) of the second region 604B. The greater intensity of colour corresponding to the first region 604A as compared to second region 604B may indicate that the first solar panel associated with the first region 604A may be comparatively greater degradation loss 204D as compared to the second solar panel associated with the second region 604B. In an example, intensity of the UV radiation falling on the first solar panel may be greater than the second solar panel due to which the degradation loss 204D associated with the first solar panel may be comparatively greater than the degradation loss 204D associated with the second solar panel. The degradation loss 204D associated with the first region may be, for example, 12%. The system 102 may compare the degradation loss of the first solar panel with the pre-determined threshold loss, which may be in the range of 2% to 10% and determine that the degradation loss 204D associated with the first solar panel of the PV power plant 602 may even be greater than the upper limit of the range corresponding to the pre-determined threshold loss. In an embodiment, the system 102 may then render the alert 504 including the recommendation to replace the first solar panel of the PV power plant 602.

The second region 604B may have a greater intensity of colour (or the second pattern) in the heatmap 604 as compared to the intensity of the third region 604C (or a third pattern). The greater intensity of colour corresponding to the second region 604B as compared with the third region 604C may indicate that the degradation loss 204D associated with the second solar panel may be comparatively greater than the degradation loss 204D associated with the third solar panel. The degradation loss 204D associated with the second solar panel may be, for example, 5% and the degradation loss 204D associated with the third solar panel may be for example, 2.5%. The system 102 may compare the degradation loss associated with each of the second solar panel and the second solar panel with the pre-determined threshold loss, which may be in the range of 2% to 10% and determine that the degradation loss associated with each of the solar panel and the third solar panel may be greater than the lower limit of the range corresponding to the pre-determined threshold loss, 2%, but lesser than the upper limit, 10%.

In an embodiment, the system 102 may then render the alert including the recommendation to repair the second solar panel and the third solar panel of the PV power plant 602. In an alternate embodiment, the system 102 may further render the one or more charts including the sequence order of repairing the second solar panel as the first to be repaired and the third solar panel as the second to be repaired based on the degradation loss associated with the second solar panel being greater than the degradation loss associated with the third solar panel.

The fourth region 604D may have the least intensity of colour (or a fourth pattern) as compared with each of the first region 604A, the second region 604B and the third region 604C. The least intensity of colour may indicate that the degradation loss 204D associated with the fourth solar panel may be comparatively lesser as compared with the degradation loss 204D associated with each of the first solar panel, the second solar panel, and the third solar panel. The degradation loss 204D associated with the fourth solar panel may be, for example, 1%. The system 102 may compare the degradation loss associated with the fourth solar panel with the pre-determined threshold loss, which may be in the range of 2% to 10% and determine that the degradation loss 204D associated with the fourth solar panel may be even lesser than the lower limit of the range corresponding to the pre-determined threshold loss. In an embodiment, the system may further render the recommendation that the repairing or the replacement of the fourth solar panel may not be urgently required.

FIG. 7 is a flowchart 700 that illustrates a first exemplary method for determination of degradation loss on solar panels of the PV power plant 104, in accordance with an embodiment of the disclosure. FIG. 7 is explained in conjunction with FIG. 1, FIG. 2, FIG. 3, FIG. 4, FIG. 5, and FIG. 6. With reference to FIG. 7, there is shown the flowchart 700. The operations of the exemplary method may be executed by the system 102 of FIG. 1 or the processor 202 of FIG. 2. The operations of the flowchart 700 may start at 702.

At 702, the first information 204A including the location information associated with the set of solar panels 106 of the PV power plant 104, the real-time weather information associated with the set of solar panels 106 of the PV power plant 104, and the configuration information associated with the set of solar panels 106 of the PV power plant 104 may be obtained. In an embodiment, the processor 202 of the system 102 may be configured to obtain the first information 204A including the location information associated with the set of solar panels 106 of the PV power plant 104, the real-time weather information associated with the set of solar panels 106 of the PV power plant 104, and the configuration information associated with the set of solar panels 106 of the PV power plant 104. Details about the first information retrieval are provided in FIG. 2 and FIG. 3.

At 704, the second information 204B including the real-time operating parameters associated with the PV power plant 104 may be obtained. In an embodiment, the processor 202 of the system 102 may be obtained to obtain the second information 204B including the real-time operating parameters associated with the PV power plant 104 from the set of sensors 108 based on the obtained first information 204A. Each sensor of the set of sensors 108 may be associated with the set of solar panels 106. Details about the second information retrieval are provided in FIG. 2 and FIG. 3.

At 706, the obtained first information 204A and the obtained second information 204B may be provided to the ML model 112. In an embodiment, the processor 202 of the system 102 may be configured to provide the obtained first information 204A and obtained second information 204B as the input to the ML model 112. The ML model 112 may be the pre-trained model. Details about the machine learning model application operation are provided in FIG. 2 and FIG. 3.

At 707, the degradation loss 204D associated with each solar panel of the set of solar panels 106 may be determined. In an embodiment, the processor 202 of the system 102 may be configured to determine the degradation loss 204D associated with each solar panel of the set of solar panels 106 based on the output of the ML model 112. Details about the degradation loss determination operation are provided in FIG. 2 and FIG. 3.

At 710, the one or more instructions associated with at least one of the repairing of at least one solar panel of the set of solar panels 106 or the replacement of at least one solar panel of the set of solar panels 106 may be transmitted to the set of robots or the set of user devices based on determined degradation loss 204D. In an embodiment, the processor 202 of the system 102 may be configured to transmit the one or more instructions associated with at least one of the repairing of at least one solar panel of the set of solar panels 106 or the replacement of at least one solar panel of the set of solar panels 106 to the set of robots or the set of user devices based on the determined degradation loss 204D. The set of user devices may be associated with the set of operators associated with the PV power plant 104. Details about the transmission operation are provided in FIG. 3.

Accordingly, blocks of the flowchart 700 support combinations of means for performing the specified functions and combinations of operations for performing the specified functions. It will also be understood the one or more blocks of the flowchart 700 and can be implemented by special-purpose hardware-based computer systems which perform the specified functions, or combinations of special-purpose hardware and computer instructions.

Alternatively, the system 102 may include means for performing each of the operations described above. In this regard, according to an example embodiment, examples of means for performing operations may include, for example, the processor 202 and/or a device or circuit for executing the computer program instructions or executing an algorithm for processing information as described above.

FIG. 8 is a flowchart 800 that illustrates a second exemplary method for determination of degradation loss on solar panels of the PV power plant 104, in accordance with an embodiment of the disclosure. FIG. 8 is explained in conjunction with FIG. 1, FIG. 2, FIG. 3, FIG. 4, FIG. 5, FIG. 6, and FIG. 7. With reference to FIG. 8, there is shown the flowchart 800. The operations of the exemplary method may be executed by the system 102 of FIG. 1 or the processor 202 of FIG. 2. The operations of the flowchart 800 may start at 802.

At 802, the first information 204A including the location information associated with the set of solar panels 106 of the PV power plant 104, the real-time weather information associated with the set of solar panels 106 of the PV power plant 104, and the configuration information associated with the set of solar panels 106 of the PV power plant 104 may be obtained. In an embodiment, the system 102 may be configured to obtain the first information 204A including the location information associated with the set of solar panels 106 of the PV power plant 104, the real-time weather information associated with the set of solar panels 106 of the PV power plant 104, and the configuration information associated with the set of solar panels 106 of the PV power plant 104. Details about the first information retrieval are provided in FIG. 2 and FIG. 3.

At 804, the second information 204B including the real-time operating parameters associated with PV power plant 104 may be obtained. In an embodiment, the system 102 may be obtained to obtain the second information 204B including the real-time operating parameters associated with the PV power plant 104 from the set of sensors 108 based on the obtained first information 204A. The set of sensors 108 may be associated with the set of solar panels 106. Details about the second information retrieval are provided in FIG. 2 and FIG. 3.

At 806, the obtained first information 204A and the obtained second information 204B may be provided to the ML model 112. In an embodiment, the system 102 may be configured to provide the obtained first information 204A and obtained second information 204B as the input to the ML model 112. The ML model 112 may be the pre-trained model. Details about the machine learning model application operation are provided in FIG. 2 and FIG. 3.

At 808, the degradation loss 204D associated with each solar panel of the set of solar panels 106 may be determined. In an embodiment, the system 102 may be configured to determine the degradation loss 204D associated with each solar panel of the set of solar panels 106 based on the output of the ML model 112. Details about the degradation loss determination operation are provided in FIG. 2 and FIG. 3.

At 810, the alert 504 may be rendered based on the determined degradation loss 204D. In an embodiment, the system 102 may be configured to render the alert 504 based on the determined degradation loss 204D. Details about the alert rendering operation are provided in FIG. 2, FIG. 3 and FIG. 5.

Accordingly, blocks of the flowchart 800 support combinations of means for performing the specified functions and combinations of operations for performing the specified functions. It will also be understood the one or more blocks of the flowchart 800 and can be implemented by special-purpose hardware-based computer systems which perform the specified functions, or combinations of special-purpose hardware and computer instructions.

Alternatively, the system 102 may include means for performing each of the operations described above. In this regard, according to an example embodiment, examples of means for performing operations may include, for example, the processor 202 and/or a device or circuit for executing the computer program instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A system, comprising:

a memory to store computer-executable instructions; and one or more processors coupled to the memory, wherein the one or more processors are configured to:

obtain first information comprising location information associated with a set of solar panels of a photovoltaic (PV) power plant, real time weather information associated with the set of solar panels of the PV power plant, and configuration information associated with the set of solar panels of the PV power plant;

obtain, from a set of sensors associated with the set of solar panels, second information comprising real-time operating parameters associated with the PV power plant based on the obtained first information;

provide, as an input, the obtained first information and the obtained second information to a machine learning (ML) model, wherein the ML model is a pre-trained model;

determine a degradation loss associated with each solar panel of the set of solar panels based on an output of the ML model; and render an alert based on determined degradation loss.

2. The system of claim 1, wherein the one or more processors are further configured to:

compare the determined degradation loss associated with each solar panel of the set of solar panels with a pre-determined threshold loss; and render the alert comprising an identifier associated with a first solar panel of the set of solar panels based on the comparison, wherein the degradation loss associated with the first solar panel is greater than the pre-determined threshold loss.

3. The system of claim 1, wherein the real-time operating parameters comprises at least one of: an operational current parameter associated with the set of solar panels, an operational voltage parameter associated with the set of solar panels, a tilt angle of one or more trackers associated with the set of solar panels, or an internal temperature of an inverter associated with the PV power plant.

4. The system of claim 1, wherein the real time weather information associated with the set of solar panels comprises at least one of: an ultraviolet (UV) index at a location of the set of solar panels, solar irradiance at the location of the set of solar panels, a wind speed at the location of the set of solar panels, a wind direction at the location of the set of solar panels, an ambient temperature at the location of the set of solar panels, solar irradiance at a front plane of the set of solar panels, solar irradiance at a rear plane of the set of solar panels, a temperature of the set of solar panels, or a humidity at the location of the set of solar panels.

5. The system of claim 4, wherein the one or more processors are further configured to:

validate the obtained second information associated with the set of solar panels based on application of one or more data validation techniques on the obtained second information; and provide, as the input, the validated second information to the ML model.

6. The system of claim 1, wherein the one or more processors are further configured to:

obtain, from one or more sources, reference information associated with the set of solar panels based on the obtained second information, wherein the reference information comprises at least one of a commissioning date associated with the set of solar panels or a pre-determined threshold loss;

provide, as the input, the obtained reference information to the ML model; and determine the degradation loss associated with each solar panel of the set of solar panels based on the output of the ML model.

7. The system of claim 1, wherein the output of the ML model is a diagnostic chart indicative of one of an increase in the degradation loss over a first time period, or a decrease in the degradation loss over the first time period.

8. The system of claim 7, wherein the diagnostic chart corresponds to a heatmap associated with the PV power plant, and wherein the heatmap indicates a distribution of the degradation loss over the PV power plant.

9. The system of claim 1, wherein the first information and second information are obtained for a first time period, and wherein the first time period is greater than a predefined threshold time period.

10. The system of claim 1, wherein the rendered alert further comprises of the degradation loss associated with each solar panel of the set of solar panels and one or more recommendations associated with one of a repair of the set of solar panels or a replacement of the set of solar panels.

11. The system of claim 1, further comprising:

generate one or more charts indicative of the degradation loss based on the obtained first information, obtained second information, the determined degradation loss, and a training dataset associated with historical degradation loss events, wherein the ML model is pre-trained on the training dataset; and render the generated one or more charts.

12. A method, comprising:

obtaining first information comprising location information associated with a set of solar panels of a photovoltaic (PV) power plant, real time weather information associated with the set of solar panels of the PV power plant, and configuration information associated with the set of solar panels of the PV power plant;

obtaining, from a set of sensors associated with the set of solar panels, second information comprising real-time operating parameters associated with the PV power plant based on the obtained first information;

providing, as an input, the obtained first information and the obtained second information to a machine learning (ML) model, wherein the ML model is a pre-trained model;

determining a degradation loss associated with each solar panel of the set of solar panels based on an output of the ML model; and rendering an alert based on determined degradation loss.

13. The method of claim 12, wherein the method further comprising:

comparing the determined degradation loss associated with each solar panel of the set of solar panels with a pre-determined threshold loss; and rendering the alert comprising an identifier associated with a first solar panel of the set of solar panels based on the comparison, wherein the degradation loss associated with the first solar panel is greater than the pre-determined threshold loss.

14. The method of claim 12, wherein the real-time operating parameters comprises at least one of: an operational current parameter associated with the set of solar panels, an operational voltage parameter associated with the set of solar panels, a tilt angle of one or more trackers associated with the set of solar panels, or an internal temperature of an inverter associated with the PV power plant.

15. The method of claim 12, wherein the real time weather information associated with the set of solar panels comprises at least one of: an ultraviolet (UV) index at a location of the set of solar panels, solar irradiance at the location of the set of solar panels, a wind speed at the location of the set of solar panels, a wind direction at the location of the set of solar panels, an ambient temperature at the location of the set of solar panels, solar irradiance at a front plane of the set of solar panels, solar irradiance at a rear plane of the set of solar panels, a temperature of the set of solar panels, or a humidity at the location of the set of solar panels.

16. The method of claim 15, wherein the method further comprising:

validating the obtained second information associated with the set of solar panels based on application of one or more data validation techniques on the obtained second information; and providing, as the input, the validated second information to the ML model.

17. The method of claim 12, wherein the method further comprising:

obtaining, from one or more sources, reference information associated with the set of solar panels based on the obtained second information, wherein the reference information comprises at least one of a commissioning date associated with the set of solar panels or a pre-determined threshold loss;

providing, as the input, the obtained reference information to the ML model; and determining the degradation loss associated with each solar panel of the set of solar panels based on the output of the ML model.

18. The method of claim 12, wherein the output of the ML model is a diagnostic chart indicative of one of an increase in the degradation loss over a first time period, or a decrease in the degradation loss over the first time period.

19. The method of claim 12, wherein the first information and second information are obtained for a first time period, and wherein the first time period is greater than a predefined threshold time period.

20. A computer programmable product comprising a non-transitory computer readable medium having stored thereon computer executable instructions, which when executed by one or more processors, cause the one or more processors to conduct operations, comprising:

obtaining first information comprising location information associated with a set of solar panels of a photovoltaic (PV) power plant, real time weather information associated with the set of solar panels of the PV power plant, and configuration information associated with the set of solar panels of the PV power plant;

obtaining, from a set of sensors associated with the set of solar panels, second information comprising real-time operating parameters associated with the PV power plant based on the obtained first information;

providing, as an input, the obtained first information and the obtained second information to a machine learning (ML) model, wherein the ML model is a pre-trained model;

determining a degradation loss associated with each solar panel of the set of solar panels based on an output of the ML model; and transmitting, to at least one of a set of robots or a set of user devices, one or more instructions associated with at least one of: repairing of at least one solar panel of the set of solar panels or replacement of at least one solar panel of the set of solar panels based on the determined degradation loss, wherein the set of user devices are associated with a set of operators associated with the PV power plant.

* * * * *